(12) United States Patent
Mukhopadhyay et al.

(10) Patent No.: US 10,757,369 B1
(45) Date of Patent: Aug. 25, 2020

(54) COMPUTER IMPLEMENTED SYSTEM AND METHOD FOR HIGH PERFORMANCE VISUAL TRACKING

(71) Applicants: Supratik Mukhopadhyay, Baton Rouge, LA (US); Saikat Basu, Baton Rouge, LA (US); Malcolm Stagg, Baton Rouge, LA (US); Robert DiBiano, Baton Rouge, LA (US); Manohar Karki, Baton Rouge, LA (US); Jerry Weltman, Baton Rouge, LA (US)

(72) Inventors: Supratik Mukhopadhyay, Baton Rouge, LA (US); Saikat Basu, Baton Rouge, LA (US); Malcolm Stagg, Baton Rouge, LA (US); Robert DiBiano, Baton Rouge, LA (US); Manohar Karki, Baton Rouge, LA (US); Jerry Weltman, Baton Rouge, LA (US)

(*) Notice: Subject to any disclaimer, the term of this patent is extended or adjusted under 35 U.S.C. 154(b) by 401 days.

(21) Appl. No.: 14/047,833

(22) Filed: Oct. 7, 2013

Related U.S. Application Data

(60) Provisional application No. 61/711,102, filed on Oct. 8, 2012, provisional application No. 61/728,126, filed on Nov. 19, 2012, provisional application No. 61/798,182, filed on Mar. 15, 2013.

(51) Int. Cl.
*H04N 7/18* (2006.01)
(52) U.S. Cl.
CPC .................... *H04N 7/18* (2013.01)
(58) Field of Classification Search
CPC ............. G06T 7/20; G06T 2207/30232; G06T 2207/30241; G06T 2207/20076
USPC .................................................. 382/100, 168
See application file for complete search history.

(56) References Cited

U.S. PATENT DOCUMENTS

| | | | | |
|---|---|---|---|---|
| 5,341,142 A * | 8/1994 | Reis | ...................... | F41G 7/2226 244/3.15 |
| 7,317,826 B2 * | 1/2008 | Wilensky | ............... | G06K 9/342 382/162 |
| 7,861,304 B1 * | 12/2010 | Nachenberg | ...... | G06F 16/90344 726/24 |
| 8,265,392 B2 * | 9/2012 | Wang | .................. | G06K 9/00248 382/173 |
| 8,516,456 B1 * | 8/2013 | Starovoitov | ............ | G06F 8/427 717/141 |
| 9,197,891 B1 * | 11/2015 | Namboodiri | ..... | H04N 19/00684 |
| 2004/0252889 A1 * | 12/2004 | Liu | ..................... | G06K 9/00201 382/190 |

(Continued)

OTHER PUBLICATIONS

Chaudry R., A. Ravichandran, G. Hager, and R. Vidal (Histograms of Oriented Optical Flow and Binet-Cauchy Kernels on Nonlinear Dynamical Systems for the Recognition of Human Actions, Computer Vision and Pattern Recognition, 2009, IEEE Conference Jun. 20-25, 2009. doi: 10.1109/CVPR.2009.5206821).*

(Continued)

*Primary Examiner* — Richard A Hansell, Jr.
(74) *Attorney, Agent, or Firm* — Worman Nydegger

(57) ABSTRACT

A computer implemented system and method of tracking objects and motion in video using techniques for agile switching between a number of tracking techniques, detecting and analyzing periodic motion, and using regular expression techniques for identifying patterns.

18 Claims, 6 Drawing Sheets

(56) References Cited

U.S. PATENT DOCUMENTS

| | | | | |
|---|---|---|---|---|
| 2005/0001759 | A1* | 1/2005 | Khosla | G01S 13/726 342/90 |
| 2005/0105764 | A1* | 5/2005 | Han | G01S 5/16 382/100 |
| 2005/0265582 | A1* | 12/2005 | Buehler | G06K 9/00335 382/103 |
| 2007/0070038 | A1* | 3/2007 | Hoffberg | H04N 21/482 345/156 |
| 2007/0291984 | A1* | 12/2007 | Yang | G06T 7/20 382/103 |
| 2008/0114710 | A1* | 5/2008 | Pucher | G06N 20/00 706/20 |
| 2008/0130948 | A1* | 6/2008 | Ozer | G06K 9/00228 382/103 |
| 2008/0240497 | A1* | 10/2008 | Porikli | G06T 7/20 382/103 |
| 2009/0112564 | A1* | 4/2009 | Schmieder | G06G 7/62 703/21 |
| 2010/0083056 | A1* | 4/2010 | Spier | G05B 23/0275 714/47.3 |
| 2011/0150285 | A1* | 6/2011 | Kimura | G01S 5/16 382/103 |
| 2011/0205359 | A1* | 8/2011 | Lee | G08B 13/19608 348/143 |
| 2012/0045090 | A1* | 2/2012 | Bobbitt | G06K 9/00771 382/103 |
| 2012/0170804 | A1* | 7/2012 | Lin | G06T 7/248 382/103 |
| 2012/0237193 | A1* | 9/2012 | Kawarada | G02B 7/34 396/95 |
| 2012/0271511 | A1* | 10/2012 | Dierks | B60Q 1/143 701/36 |
| 2013/0019216 | A1* | 1/2013 | Vasudevan | G06F 30/3323 716/106 |
| 2013/0039409 | A1* | 2/2013 | Gupta | G06K 9/00771 375/240.02 |
| 2013/0063556 | A1* | 3/2013 | Russell | G06T 7/579 348/42 |
| 2013/0088600 | A1* | 4/2013 | Wu | G08G 1/054 348/149 |
| 2013/0176430 | A1* | 7/2013 | Zhu | G06T 7/254 348/143 |
| 2014/0064618 | A1* | 3/2014 | Janssen, Jr. | G06F 40/211 382/182 |

OTHER PUBLICATIONS

Smith M.J., R. D. Quinn, A. Boxerbaum and G. L. Peterson (Electronic Image Stabilization using Optical Flow with Inertial Fusion, 2010 IEEE RSJ International Conference on Intelligent Robots and Systems, Oct. 18-22, 2010, Taipei, Taiwan).*
Guraya et al., People Tracking via a Modified CAMSHIFT Algorithm, Jan. 2009 (obtained via Research Gate—https://www.researchgate.net/publication/228753108_People_Tracking_via_a_Modified_CAMSHIFT_Algorithm).*
Cha et al., 'On measuring the distance between histograms', Pattern Recognition, 35 (2002) 1355-1370.*
Muddassar A. and K. Meinke IDS: An Incremental Learning Algorithm for Finite Automata, Jun. 13, 2012, (Online). Available: https://arxiv.org/abs/1206.2691.*
M. Piccardi "Background subtraction techniques: a review" 2004 IEEE International Conference on Systems, Man and Cybernetics (Year: 2004).*
Chaudry R., A. Ravichandran, G. Hager, and R. Vidal (Histograms of Oriented Optical Flow and Binet-Cauchy Kernels on Nonlinear Dynamical Systems for the Recognition of Human Actions, Computer Vision and Pattern Recognition, 2009, IEEE Conference Jun. 20-25, 2009. doi: 10.1109/CVPR.2009.5206821) (Year: 2009).*
Smith M.J., R. D. Quinn, A. Boxerbaum and G. L. Peterson (Electronic Image Stabilization using Optical Flow with Inertial Fusion, 2010 IEEE RSJ International Conference on Intelligent Robots and Systems, Oct. 18-22, 2010, Taipei, Taiwan) (Year: 2010).*
Guraya et al., People Tracking via a Modified CAMSHIFT Algorithm, Jan. 2009 (obtained via Research Gate—https://www.researchgate.net/publication/228753108_People_Tracking_via_a_Modified_CAMSHIFT_Algorithm) (Year: 2009).*
Cha et al., 'On measuring the distance between histograms', Pattern Recognition, 35 (2002) 1355-1370 (Year: 2002).*
Muddassar A. and K. Meinke IDS: An Incremental Learning Algorithm for Finite Automata, Jun. 13, 2012, (Online). Available: https://arxiv.org/abs/1206.2691 (Year: 2012).*
B. D. Lucas and T. Kanade, "An Iterative Image Registration Technique With an Application to Stereo Vision", Proc. Seventh International Joint Conference on Artificial Intelligence (IJCAI-81), Vancouver. pp. 674-679, 1981.
Chris Ding and Xiaofeng He, "K-means Clustering via Principal Component Analysis", Proc. of Int'l Conf. Machine Learning (ICML 2004), pp. 225-232. Jul. 2004.
D. Opitz, R. Maclin, "Popular ensemble methods: An empirical study", Journal of Artificial Intelligence Research, 11: 169-198, 1999.
J. Shi and C. Tomasi, "Good Features to Track", 9th IEEE Conference on Computer Vision and Pattern Recognition, pp. 593-600, 1994.
J.Y. Bouguet, "Pyramidal implementation of the lucas kanade feature tracker : description of the algorithm," OpenCV Document, Intel, Microprocessor Research Labs, 2000.
Kaiki Huang and Tieniu Tan, "Vs-star: A Visual Interpretation System for Visual Surveillance", Pattern Recognition Letters, 31(14):2265-2285, 2010.
L. Rokach, "Ensemble-based classifiers". Artificial Intelligence Review 33 (1-2): 1-39, 2010.
N. Funk, "A study of the Kalman filter applied to visual tracking." Technical report, University of Alberta, 2003.
P. Kaewtrakulpong and R. Bowden, "An Improved Adaptive Background Mixture Model for Real-Time Tracking With Shadow Detection", Proc. European Workshop Advanced Video Based Surveillance Systems, 2001.
R. Polikar, "Ensemble based systems in decision making". IEEE Circuits and Systems Magazine 6 (3): 21-45, 2006.
X. Lan and D. Huttenlocher. A unified spatio-temporal articulated model for tracking.CVPR, vol. 1, pp. 722-729, 2004.
Z. Kalal, J. Matas, and K. Mikolajczyk. P-N Learning: Bootstrapping Binary Classifiers from Unlabeled Data by Structural Constraints. In Conference on Computer Vision and Pattern Recognition, 2010.
Z. Kim. Real time object tracking based on dynamic feature grouping with background subtraction. In CVPR, 2008.
VIRAT video dataset, web source: viratdata.org.
LSU Agile Framework Tracker, https://xythos.lsu.edu/users/mstagg3/web/tracker/.
C. Chang, R. Ansari, and A. Khokhar, "Multiple object tracking with kernel particle filter", in Proc. CVPR, 2005, pp. 566-573.
O. Williams, A. Blake, and R. Cipolla. A sparse probabilistic learning algorithm for real-time tracking. In Proc. Int'l Conf. Computer Vision, pp. 353-360, Nice, France, 2003.
R. Schapire. The boosting approach to machine learning: An overview. In MSRI Workshop on Nonlinear Estimation and Classification, 2001.
P. M. Long and R. A. Servedio, "Random classification noise defeats all convex potential boosters", In International Conference on Machine Learning, pp. 608-615, 2008.
P. Viola and M. Jones, "Rapid object detection using a boosted cascade of simple features", In Computer Vision and Pattern Recognition, vol. 1, pp. 511-518, 2001.
M. Andriluka, S. Roth, B. Schiele, "People-Tracking-by-Detection and People-Detection-by-Tracking" IEEE Conf. on Computer Vision and Pattern Recognition (CVPR'08), Anchorage, USA, Jun. 2008.
E. Maggio and A. Cavallaro, "Hybrid particle filter and mean shift tracker with adaptive transition model," in Proc. of IEEE International Conf. on Acoustics, Speech, and Signal Processing, Philadelphia, 2005.

(56) References Cited

OTHER PUBLICATIONS

D. Ross, J. Lim, R.-S.Lin, and M.-H. Yang. Incremental learning for robust visual tracking. IJCV, 77(1):125-141, May 2008.
B. Babenko, M. Yang, and S. Belongie. "Visual Tracking with Online Multiple Instance Learning", CVPR, 2009.
Z. Kalal, J. Matas, and K. Mikolajczyk, "Online learning of robust object detectors during unstable tracking," On-line Learning for Computer Vision Workshop, 2009.
Z. Kalal, K. Mikolajczyk, and J. Matas, "Forward-Backward Error: Automatic Detection of Tracking Failures," International Conference on Pattern Recognition, 2010, pp. 23-26.
Z. Kalal, K. Mikolajczyk, and J. Matas, "Tracking-Learning-Detection," Pattern Analysis and Machine Intelligence, 2011.
Tomás Crivelli, Patrick Bouthemy, Bruno Cernuschi Frias, and Jian-feng Yao, "Mixed-State Markov Models in Image Motion Analysis", Book Chapter in Machine Learning for Vision-Based Motion Analysis, Springer, 2011.
Paolo Lombardi and Cristina Versino, "Learning to Detect Event Sequences in Surveillance Streams at Very Low Frame Rate", Book Chapter in Machine Learning for Vision-Based Motion Analysis, Springer, 2011.
Xiaoyu Wang, Gang Hua, and Tony X. Han, "Discriminative Multiple Target Tracking", Book Chapter in Machine Learning for Vision-Based Motion Analysis, Springer, 2011.
Guoliang Fan and Xin Zhang, "Video-Based Human Motion Estimation by Part-Whole Gait Manifold Learning", Book Chapter in Machine Learning for Vision-Based Motion Analysis, Springer, 2011.
D. Comaniciu, V. Ramesh, and P. Meer "Real-Time Tracking of Non-Rigid Objects Using Mean-Shift," Proc. 2000 IEEE Conf. Computer Vision and Pattern Recognition, 2000.
Ahad, Md., Tan, J., Kim, H., Ishikawa, S., 2010, Motion history image: its variants and applications, Machine Vision and Applications, pp. 1-27.
Bui, H. H., 2003. A general model for online probabilistic plan recognition. In Proceedings of the Eighteenth International Joint Conference on Artificial Intelligence (IJCAI-03).
Chuang, C. H., Hsieh, J.W., Fan, K.C., 2007. Suspicious Object Detection and Robbery Event Analysis. Computer Communications and Networks, 2007.
ICCCN 2007. Proceedings of 16th International Conference on, pp. 1189-1192.
Giordano, L., Martelli, A., Schwind, C., 2001. Reasoning about actions in dynamic linear time temporal logic, in: FAPR'00—Int. Conf. on Pure and Applied Practical Reasoning, London, Sep. 2000, Logic J. IGPL 9 (2) 289-303.
Kautz, H., 1987. A formal theory of plan recognition, In PhD thesis, University of Rochester.
Kreutzmann, A., Colonius, I., Frommberger, L., Dylla, F., Freksa, C., Wolter, D., 2011. On Process Recognition by Logical Inference Proceedings of the European Conference on Mobile Robots.
Junejo, I., Dexter, E., Laptev, I., P'erez, P.,2008. Cross-view action recognition from temporal self-similarities. In: Forsyth, D., Torr, P., Zisserman, A. (eds.) ECCV 2008, Part II. LNCS, vol. 5303, pp. 293-306.
Lucas, B. D., Kanade, T., 1981. An Iterative Image Registration Technique With an Application to Stereo Vision. Proc. Seventh International Joint Conference on Artificial Intelligence (IJCAI-81), Vancouver, pp. 674-679.
Pnueli, A., 1977. The temporal logic of programs. Proceedings of the 18th Annual Symposium on Foundations of Computer Science (FOCS), 46-57.
Poole, D., 1993. Logic Programming, Abduction and Probability: a top-down anytime algorithm for estimating prior and posterior probabilities. New Generation Computing, vol. 11, No. 3-4, pp. 377-400.
Raghavan, S. Mooney, R. J., 2011. Abductive Plan Recognition by Extending Bayesian Logic Programs, In Proc. of ECML/PKDD.
Shao, L., Ji, L., Liu, Y. and Zhang, J.,2012, Human Action Segmentation and Recognition via Motion and Shape Analysis, Pattern Recognition Letters, vol. 33(4), pp. 438-445.
Zhou, Q., Aggarwal, J. K., 2006. Object tracking in an outdoor environment using fusion of feature and cameras. Image and Vision Comp., 24(11):1244-1255.
H. Kautz. "A formal theory of plan recognition". In PhD thesis, University of Rochester, 1987.
Hagar, G., Belhumeur, P.: Efficient Region Tracking With Parametric Models of Geometry and Illumination, IEEE Transactions on Pattern Analysis and Machine Intel—ligence vol. 20 No. 10: pp. 1125-1139.
H. Tao, H.S. Sawhney, and R. Kumar, "Object Tracking with Bayesian Estimation of Dynamic Layer Representations," IEEE Trans. Pattern Analysis and Machine Intelligence, vol. 24, No. 1, pp. 75-89, Jan. 2002.
Choi, Wongun, and Silvio Savarese. "A Unified Framework for Multi-target Tracking and Collective Activity Recognition." Computer Vision—ECCV 2012 (2012): 215-230.
Oltramari, Alessandro, and Christian Lebiere. "Using Ontologies in a Cognitive-Grounded System: Automatic Action Recognition in Video Surveillance."
Asad Butt and R.Collins, "Multiple Target Tracking using Frame Triplets," Asian Conference on Computer Vision (ACCV'12), Nov. 2012.
Ess, A., Leibe, B., Schindler, K., van Gool, L.: A mobile vision system for robust multi-person tracking. In: IEEE Conference on Computer Vision and Pattern Recognition (CVPR'08), IEEE Press (2008).
Wu, B., Nevatia, R.: Tracking of multiple, partially occluded humans based on static body part detection. In: Computer Vision and Pattern Recognition, 2006 IEEE Computer Society Conference on. vol. 1. (2006) 951-958.
Zhang, L., Li, Y., Nevatia, R.: Global data association for multi-object tracking using network ows. In: Computer Vision and Pattern Recognition, 2008. CVPR 2008. IEEE Conference on. (2008) 1-8.
Brendel, W., Amer, M., Todorovic, S.: Multiobject tracking as maximum weight independent set. In: Computer Vision and Pattern Recognition (CVPR), 2011, IEEE Conference on. (2011) 1273-1280.
Song, B., Jeng, T., Staudt, E., Roy-Chowdhury, A.: A Stochastic Graph Evolution Framework for Robust Multi-Target Tracking. (vol. 2010.).
Berclaz, J., Fleuret, F., Turetken, E., Fua, P.: Multiple object tracking using k-shortest paths optimization. Pattern Analysis and Machine Intelligence, IEEE Transactions on 33 (2011) 1806-1819.
Moreno-Noguer F., Sanfeliu A., Samaras D.: Dependent multiple cue integration for robust tracking. Pattern Analysis and Machine Intelligence, IEEE Transactions 30(4) (2008) 670-685.
Scalaris, a distributed, transactional key-value store: https://github.com/scalaristeam/scalaris.
K. Smith, D. Gatica-Perez, J. Odobez, and S. Ba, "Evaluating Multi-Object Tracking," Proc. IEEE Empirical Evaluation Methods in Computer Vision Workshop, Jun. 2005.
M. Woolridge, "An Introduction to MultiAgent Systems", John Wiley, 2002.
S.S.Iyengar,Supratik Mukhopadhyay, Christopher Steinmuller, and Xin Li "Preventing Future Oil Spills with Software-Based Event Detection" IEEE Computers, pp. 76-78,Aug. 2010.
V. Vapnik and A. Vashisht, "Learning Using Hidden Information", Technical Report NEC Laboratories of America.
R. Bharadwaj, S. Mukhopadhyay: A Formal Approach to Developing Reliable Event-Driven Service-Oriented Systems. COMPSAC 2008: 227-230.
What is Scalaris? http://code.google.com/p/scalaris/.
W.R. Schwartz, A. Kembhavi, D. Harwood, L.S. Davis. Human Detection Using Partial Least Squares Analysis. Proceedings of the International Conference on Computer Vision (ICCV'2009), Kyoto, Japan, Sep. 27-Oct. 4, 2009.
Ivan Laptev, "Local Spatio-Temporal Image Features for Motion Interpretation" (2004), PhD Thesis, Jun. 11, 2004 at Computational Vision and Active Perception Laboratory (CVAP), NADA, KTH, Stockholm.

(56) References Cited

OTHER PUBLICATIONS

Juergen Gall, Nima Razavi, and Luc Van Gool, "An Introduction to Random Forests for Multi-class Object Detection".

J. Gall, A. Yao, N. Razavi, L. Van Gool, and V. Lempitsky, "Hough forests for object detection, tracking, and action recognition", TPAMI, 2011.

D. Xu and S.-F. Chang, "Video event recognition using kernel methods with multilevel temporal alignment", T-PAMI, 1985-1997, 2008.

J. C. Niebles, C.-W. Chen and L. Fei-Fei, "Modeling Temporal Structure of Decomposable Motion Segments for Activity Classification", Proceedings of the 12th European Conference of Computer Vision (ECCV). 2010.

L. Fei-Fei and L.-J. Li, "What, Where and Who? Telling the Story of an Image by Activity Classification, Scene Recognition and Object Categorization", Book chapter in "Studies in Computational Intelligence- Computer Vision". vol. 285/2010, Springer, 2010.

Vlad I. Morariu, V. Shiv Naga Prasad, and Larry S. Davis, "Human Activity Understanding using Visibility Context", IEEE/RSJ IROS Workshop: From sensors to human spatial concepts (FS2HSC), 2007.

Turaga, P., Chellappa, R., Subrahmanian, V., Udrea, O.: Machine recognition of human activities: A survey. Circuits and Systems for Video Technology, IEEE Transactions on 18 (2008) 1473-1488.

Aggarwal, J., Ryoo, M.: Human activity analysis: A review. ACM Comput. Surv.43 (2011) 16:1{16:43.

Shah, M., Javed, O., Shafique, K.: Automated visual surveillance in realistic scenarios. IEEE MultiMedia 14 (2007) 30-39.

Bollig, B., Katoen, J.P., Kern, C., Leucker, M., Neider, D., Piegdon, D.R.: libalf: The automata learning framework. In: In Proceedings of CAV. (2010).

Muzatko, P.: Approximate regular expression matching. Technical report, (Czech Technical University) http://www.stringology.org/cgi-bin/getfile.cgi?t=pdf&c=-&y=1996&n=5.

Tesson, P., Therien, D.: Logic meets algebra: The case of regular languages. In: In Proceedings of LICS. (2005).

Oh, S., Hoogs, A., Perera, A.G.A., Cuntoor, N.P., Chen, C.C., Lee, J.T., Mukherjee, S., Aggarwal, J.K., Lee, H., Davis, L., Swears, E., Wang, X., Ji, Q., Reddy, K.K., Shah, M., Vondrick, C., Pirsiavash, H., Ramanan, D., Yuen, J., Torralba, A., Song, B., Fong, A., Chowdhury, A.K.R., Desai, M.: A large-scale benchmark dataset for event recognition in surveillance video. In: CVPR. (2011) 3153{3160. Recognition of Human Actions: http://www.nada.kth.se/cvap/actions/.

Hoogs, A., Perera, A.G.A.: Video activity recognition in the real world. In: Proceedings of AAAI. (2008) ECCV-12 submission ID***.

An agile framework for real-time motion tracking. (Provided as supplementary material).

Li, B. Ayazoglu, M., Mao, T., Camps, O., Sznaier, M.: Activity recognition using dynamic subspace angles. In: Computer Vision and Pattern Recognition (CVPR), 2011 IEEE Conference on. (2011) 3193 {3200.

Choi, W., Shahid, K., Savarese, S.: Learning context for collective activity recognition. In: Computer Vision and Pattern Recognition (CVPR), 2011 IEEE Conference on. (2011) 3273 {3280.

Lin, W., Sun, M.T., Poovandran, R., Zhang, Z.: Human activity recognition for video surveillance. In: Circuits and Systems, 2008. ISCAS 2008. IEEE International Symposium on. (2008) 2737-2740.

Messing, R. Pal, C. Kautz, H.: Activity recognition using the velocity histories of tracked keypoints. In: Computer Vision, 2009 IEEE 12th International Conference on. (2009) 104-111.

Resendiz, E., Ahuja, N.: A unified model for activity recognition from video sequences. In: Pattern Recognition, 2008. ICPR 2008. 19th International Conference on. (2008) 1-4.

Ryoo, M.S., Aggarwal, J.K.: Recognition of composite human activities through context-free grammar based representation. Computer Vision and Pattern Recognition, IEEE Computer Society Conference on 2 (2006) 1709-1718.

Gaur, U. Zhu, Y. Song, B., Roy-Chowdhury, A.: A "string of feature graphs" model for recognition of complex activities in natural videos. Computer Vision, IEEE International Conference on 0 (2011) 2595-2602.

Jiang, Y.G., Li, Z., Chang, S.F.: Modeling scene and object contexts for human action retrieval with few examples. Circuits and Systems for Video Technology, IEEE Transactions on 21 (2011) 674-681.

Shet, V., Harwood, D., Davis, L.: Vidmap: video monitoring of activity with prolog. In: Advanced Video and Signal Based Surveillance, 2005. AVSS 2005. IEEE Conference on. (2005) 224-229.

Chen, C.C., Aggarwal, J.K.: Modeling human activities as speech. In: CVPR. (2011) 3425-3432.

Bhargava, M., Chen, C.C., Ryoo, M.S., Aggarwal, J.K.: Detection of object abandonment using temporal logic. Mach. Vis. Appl. 20 (2009) 271-281.

Zeng, Z., Ji, Q: Knowledge based activity recognition with dynamic Bayesian network. In: ECCV (6). (2010) 532-546.

Tran, S.D., Davis, L.S.: Event modeling and recognition using markov logic networks. In: ECCV (2). (2008) 610-623.

Laptev, I., Marszalek, M., Schmid, C., Rozenfeld, B.: Learning realistic human actions from movies. Computer Vision and Pattern Recognition, IEEE Computer Society Conference on 0 (2008) 1-8.

Ali, S., Shah, M.: Human action recognition in videos using kinematic features and multiple instance learning. IEEE Trans. Pattern Anal. Mach. Intell. 32 (2010) 288-303.

Hoperoft, J.E., Ullman, J.D.: Introduction to Automata Theory, Languages and Computation. Addison-Wesley (1979).

Pnueli, A.: The temporal logic of programs. In: FOCS. (1977) 46-57.

Schuldt, C., Laptev, I., Caputo, B.: Recognizing human actions: A local svm approach. In: ICPR (3). (2004) 32-36 (Will get from Supratik).

Niebles, J.C.,Wang, H., Li, F.F.: Unsupervised learning of human action categories using spatial-temporal words. In: BMVC. (2006) 1249-1258.

Formal Concept Analysis Homepage: http://www.upriss.org.uk/fca/fca.html.

R. Ramakrishnan. "Magic Templates: A Spellbinding Approach to Logic Programs." J. Log. Program. 11(3&4): 189-216 (1991).

R. E. Bryant. "Graph-Based Algorithms for Boolean Function Manipulation." IEEE Trans. Computers 35(8): 677-691 (1986).

T. S. C. Chou and M. Winslett. "The Implementation of a Model-based Belief Revision System", ACM SIGART Bulletin, 1991, pp. 28-34, vol. 2 (3).

L. de Alfaro, T. A. Henzinger and O. Kupferman. "Concurrent Reachability Games". In Proceedings of FOCS 1998: 564-575.

Y. Xia, S. S. Iyengar, N. E. Brener: An Event Driven Integration Reasoning Scheme for Handling Dynamic Threats in an Unstructured Environment. Artif. Intell. 95(1): 169-186 (1997).

Amir Pnueli: The Temporal Logic of Programs FOCS 1977: 46-57.

Gregory Vert, S. Sitharama Iyengar, Vir V. Phoha: Defining A New Type of Global Information Architecture for Contextual Information Processing. IKE 2009: 214-219

G. Brewka: "Nonmonotonic reasoning: logical foundations of commonsense", Cambridge University Press, 1991.

L. Console, P. Torasso: A spectrum of logical definitions of model-based diagnosis. Computational Intelligence 7: 133-141 (1991).

R. Khardon, D. Roth: Learning to reason. J. ACM 44(5): 697-725 (1997).

L. G. Valiant: Robust logics. Artif. Intell. 117(2): 231-253 (2000).

E. Ryvkina, A. S. Maskey, M. Cherniack, S. Zdonik. Revision Processing in a Stream Processing Engine: A High-Level Design. In proceedings of the 22nd International Conference on Data Engineering (ICDE'06), Atlanta, GA, Apr. 2006

J. Agrawal, Y. Diao, D. Gyllstrom, and N. Immerman. Efficient Pattern Matching over Event Streams. In Proceedings of SIGMOD 2008.

K. M. Chandy, M. Charpentier, M. Capponi: Towards a Theory of Events, In Proceedings of Distributed Event Based Systems (DEBS 07) Conference; 2007.

D. Luckham: The Power of Events :An Introduction to Complex Event Processing in Distributed Enterprise Systems, Addison Wesley, 2002.

(56) References Cited

OTHER PUBLICATIONS

Mikael Berndtsson, Marco Seiriö (Oct. 24, 2005). "Design and Implementation of an ECA Rule Markup Language". Springer Verlag.

The Yices SMT Solver: yices.csl.sri.com.

W. Wang, S. S. Iyengar: Efficient Data Structures for Model-Based 3-D Object Recognition and Localization from Range Images. IEEE Trans. Pattern Anal. Mach. Intell. 14(10): 1035-1045 (1992).

S. Krishnamurthy, S. Sitharama Iyengar, R. Holyer, M. Lybanon: Topographic-based feature labeling for infrared oceanographic images. Pattern Recognition Letters 14(11): 915-925 (1993).

Y. Wu, S. Sitharama Iyengar, R. Jain, S. Bose: A New Generalized Computational Framework for Finding Object Orientation Using Perspective Trihedral Angle Constraint. IEEE Trans. Pattern Anal. Mach. Intell. 16(10): 961-975 (1994).

Data Distribution Service—Wikipedia, the free Encyclopedia: http://en.wikipedia.org/wiki/Data_Distribution_Service.

Security Analytics: WebTAS 3.0: http://securityanalytics.blogspot.com/2007/12/webtas-30.html.

S. La Torre, S. Mukhopadhyay, A. Murano: Optimal-Reachability and Control for Acyclic Weighted Timed Automata. IFIP TCS 2002: 485-497.

M. Peralta, S. Mukhopadhyay, R. Bharadwaj: A Formal Framework for Developing High Assurance Event Driven Service-Oriented Systems, In High Assurance Web Services, Springer Verlag, 145-162, 2009.

Northrop Grumman Tucana Technologies http://www.globenewswire.com/newsroom/news.html?d=86459.

S. Balemi, "Control of discrete event systems: Theory and application,". Ph.D. dissertation, Automatic Control Laboratory, Swiss Federal Institute, 1992.

Iyengar, S.S., Brooks, "Distributed Sensor Networks", Microsensor Applications, pp. 18-19.

Kiran K. Simhadri, S.S. Iyengar, Ronald J. Holyer, Matthew Lybanon and John M. Zachary, Jr. "Wavelet-Based Feature Extraction from Oceanographic Images", IEEE Transactions on Geoscience and Remote Sensing, vol. 36, No. 3, May 1998.

D. Kahneman and A. Tversky, Prospect Theory: An Analysis of Decision under Risk, Econometrica, XLVII (1979), 263-291.

Antoniou, Grigoris. "A Tutorial on Default Logics", ACM Computing Surveys, vol. 31, No. 3, Sep. 1999.

Bochman, Epistemic States. Nonmonotonic inference and its kinds, 2001.

Schuldt, Christian, Ivan Laptev, Barbara Caputo. "Recognizing Human Actions: A Local SVM Approach", Proceedings of the 17th International Conference on pattern Recognition (ICPR'04).

Iyengar, S.S., Brooks, "Distributed Sensor Networks", Chapman & Hall/CRC Computer and Information Science Series.

\* cited by examiner

COMPUTER IMPLEMENTED SYSTEM AND METHOD FOR HIGH PERFORMANCE VISUAL TRACKING

CROSS-REFERENCE TO RELATED APPLICATIONS

This application claims priority from U.S. Provisional Application Nos. 61/711,102 (Mukhopadhyay et al.), filed Oct. 8, 2012, 61/728,126 (Mukhopadhyay et al.), filed Nov. 19, 2012, and 61/798,182 (Mukhopadhyay et al.), filed Mar. 15, 2013, which are all incorporated herein by reference as if set forth in full below.

STATEMENT OF GOVERNMENT RIGHTS

This invention was made with U.S. Government support under grant W911NF-10-1-0495 awarded by the Army Research Office. The U.S. Government has certain rights in the invention.

BACKGROUND OF THE INVENTION

I. Field of the Invention

The disclosed invention relates to computer implemented systems and methods for tracking the motion of objects in video, detecting patterns in the motion of said objects, and reasoning about said tracked motion and said patterns to identify activities or events.

II. General Background

Computer vision techniques have been researched for many years, and such techniques have been applied to the field of computer video surveillance. However, in our view, existing methods do not reliably track objects across varying environmental or lighting conditions, do not detect abstract patterns of periodic and non-periodic motion, and do not reliably reason about activities or events.

Moreover, existing visual tracking algorithms cannot automatically adapt to changes in lighting conditions, background, types of sensors (infrared vs. visible spectrum) and their dynamics (pan, tilt, zoom, and other motion). Similarly, they cannot gracefully handle data that simultaneously contains different types of motions such as both slow and fast moving objects, periodic and non-periodic motion, track-based and articulated activities, and motion that results in an occluded object. Also, many of the existing tracking algorithms cannot start the tracking process automatically, as they require a user to draw a box on an object that needs to be tracked for the process to be initiated.

Similarly, in our view, existing techniques do not reliably detect abstract patterns of motion. Some techniques require a large amount of training data for good performance (which training data may not be available in all circumstances). Thus, in our view, there exists no uniform framework that can be efficiently applied to a wide class of problems and can be seamlessly integrated with reasoning platforms to provide inferences at a higher level of abstraction.

SUMMARY OF THE INVENTION

The disclosed invention includes computer implemented systems and methods for tracking the motion of objects in video, detecting patterns in the motion of said objects, and reasoning about said tracked motion and said patterns to identify activities or events. As such, one aspect of the disclosed invention is an agile framework for real-time visual tracking, including an ensemble algorithm for switching between a number of object tracking algorithms. Other aspects of the disclosed invention also include computer implemented methods for extracting patterns from the position of tracked objects as a pattern string, extracting patterns of articulated motion as a pattern string using directional histograms, building finite state automatons, converting finite state automatons to regular expressions, comparing said pattern strings to said regular expressions to identify patterns of motion, and reasoning about said tracked objects and said patterns of activity using linear temporal logic, abductive reasoning, and Bayesian statistical methods to identify activities.

Embodiments of the invention are implemented using computers, including, without limitation, server computers and terminals, which may be networked. Each computer of a network may include one or more processors such as a microprocessor, microcontroller, logic circuitry or the like. The processor or processors may include a special purpose processing device such as an ASIC, PAL, PLA, PLD, Field Programmable Gate Array, or other customized programmable device. Each computer may also include a memory such as volatile or non-volatile memory, static RAM, dynamic RAM, ROM, CD-ROM, disk, tape, magnetic, optical, flash memory, or other computer storage medium. The processor or processors may include L1, L2, or L3 cache, or other memory. Values calculated by the processor or processors may be stored in memory, whether memory included as part of the processor package or otherwise. It is understood that the computer may run software that is stored in such a computer readable medium. The computer may also include various input devices and/or output devices. The input device(s) may include a keyboard, mouse, touch screen, light pen, tablet, microphone, sensor, magnetic stripe reader (including, without limitation, a credit or debit card magnetic stripe reader) or other input hardware with accompanying firmware and/or software. The output device(s) may include a printer, monitor, speakers, or other output hardware with accompanying firmware and/or software.

Suitable networks for configuration and/or use as described herein include one or more local area networks, wide area networks, metropolitan area networks, ham radio networks, and/or Internet Protocol networks such as the World Wide Web, a private Internet, a secure Internet, a value-added network, a virtual private network, an extranet, an intranet, closed circuit television network, or even stand-alone machines which communicate with other machines by physical transport of media. In particular, a suitable network may be formed from parts or entireties of two or more networks of the same or differing type or which using disparate hardware and network communication technologies. A network may incorporate wired or land line communication such as Ethernet over twisted pair, T-carrier, or other wired communications technologies. A network may also incorporate wireless communications technologies such as GPRS, EDGE, EV-DO, HSPA, HSDPA, and technologies based on the IEEE 802.11 set of standards.

The network may include communications or networking software such as software available from Novell, Microsoft, Artisoft, and other vendors, and may operate using TCP/IP, SPX, IPX, and other protocols over twisted pair, coaxial, or optical fiber cables, telephone lines, satellites, microwave relays, modulated AC power lines, physical media transfer, and/or other data transmission technologies and methods known to those of skill in the art. The network may encompass smaller networks and/or be connectable to other networks through a gateway or similar mechanism.

Suitable networks can include a server and several clients; other suitable networks may contain other combinations of servers, clients, and/or peer-to-peer nodes, and a given computer may function both as a client and as a server. Each network can include one or more computers, such as the server and/or clients. A computer may be a workstation, laptop computer, disconnectable mobile computer, server, mainframe, cluster, so-called "network computer" or "thin client", a computing appliance, mobile telephone, smartphone, personal digital assistant or other hand-held computing device, "smart" consumer electronics device, or a combination thereof.

Aspects of certain of the embodiments described herein are illustrated as software modules or components. As used herein, a software module or component may include any type of computer instruction or computer executable code located within a memory device and/or transmitted as electronic signals over a system bus or wired or wireless network. A software module may, for instance, comprise one or more physical or logical blocks of computer instructions, which may be organized as a routine, program, object, component, data structure, etc., which performs one or more tasks or implements particular data structures.

In certain embodiments, a particular software module may comprise disparate instructions stored in different locations of a memory device, which together implement the described functionality of the module. A module may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

The software modules tangibly embody a program, functions, and/or instructions that are executable by computer(s) to perform tasks as described herein. Suitable software, as applicable, may be readily provided by those of skill in the pertinent art(s) using the teachings presented herein and programming languages and tools including, but not limited to, XML, Java, Javascript, Python, PHP, Pascal, COBOL, C++, C, R, Matlab, Mathematica, Weka, Redis, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

Additional features and advantages are realized through the techniques of the present invention. Other embodiments and aspects of the invention are described in detail herein and are considered a part of the invention. For a better understanding of the invention with advantages and features, refer to the description and the drawings.

The disclosed invention may be understood as a computer system for tracking motion in a video system comprising a computer containing a plurality of software modules, a camera, and an alarm, wherein said camera and said alarm are operatively connected to said computer, and wherein said plurality of software modules further comprise: (1) an image receiving module that receives images from a video stream, (2) an object tracking module that produces a tracked path, and (3) a track identification module that performs a comparison of said tracked path to a model, wherein said computer system has the capability to invoke said alarm based on said comparison.

BRIEF DESCRIPTION OF THE DRAWINGS

The foregoing and other objects, features, and advantages of the invention are apparent from the following detailed description taken in conjunction with the accompanying drawings in which like parts are given like reference numerals and, wherein.

DETAILED DESCRIPTION

The disclosed invention is a system and method for tracking the motion of objects in video, detecting patterns in the motion of said objects, and reasoning about said tracked motion and said patterns to identify activities or events.

Figure 1:
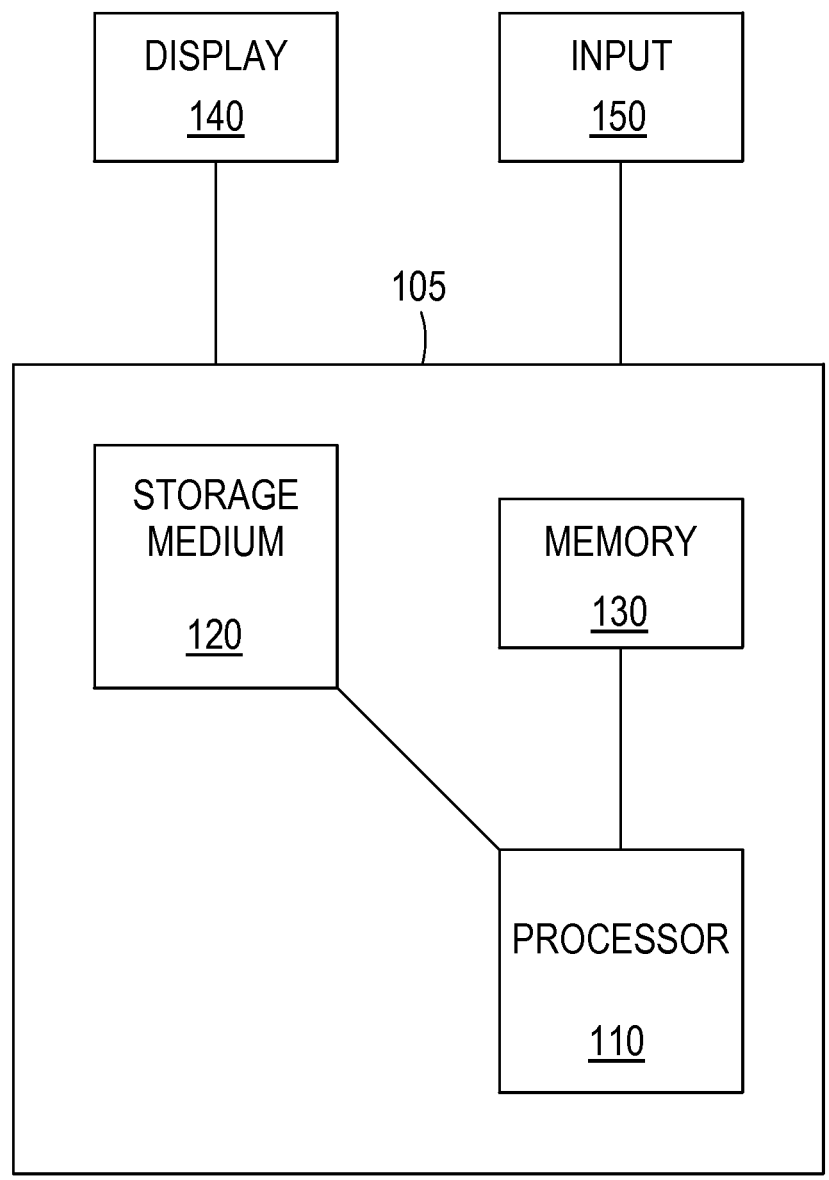
FIG. 1 is a block diagram depicting a computer system for performing methods of the disclosed invention.

FIG. 1 illustrates analysis system 100, which includes a computer system 105 containing a processor 110, a storage medium 120, memory 130, display 140, and input 150. Processor 110 is a processor utilizing any suitable architecture, including a microarchitecture, examples of such being an Intel Core i7 brand microprocessor or other processor supporting the x86, x86-64, IA-32, or IA-64 architectures or their equivalent; or an Apple A6 processor or other processor supporting the ARM architecture or its equivalent. Storage medium 120 may be any computer storage medium including, without limitation, a hard disk, a solid state disk (SSD) (e.g., flash memory), a CD-ROM drive and disk, or removable USB storage (including, but not limited to a "flash" drive). Memory 130 is RAM or random access memory and is used in the operation of computer system 105. Display 140 is any suitable output device including, without limitation, a liquid crystal display, cathode ray tube display, or other video display. Display 140 may also be any type of output device, including, without limitation, any visual or non-visual display technology such as printers, refreshable braille displays, speakers, and other devices for non-visual communication. Input 150 may be any suitable input device, or combinations of input devices, including, without limitation, a capacitive or resistive touch screen, a microphone, a mouse, a keyboard, an infrared or visible spectrum camera, or any other device capable of receiving or collecting information. Analysis system 100 may comprise part or all of one or more computer systems 105, together embodying a single analysis system 100. Computer system 105 may be a desktop computer, a rack-mountable or other server (whether suitable for a home, office, enterprise, or data center environment), or a mobile or tablet computing device such as an iPhone, iPad, Android, or Windows Mobile based computing device or other suitable computing device. Computer system 105 may also be a combination of any number of such computers connected by means of any suitable network or combinations of networks. Computer system 105 contains a computer program product comprising a storage medium 120 having a computer readable or usable program, wherein said computer readable program, when executed on a computer, causes the computer to perform functions described herein. Said computer readable or usable program may be non-compiled computer source code (such as for use with an interpreter or just-in-time compiler), compiled object code, assembly code, or any combination thereof.

Figure 2:
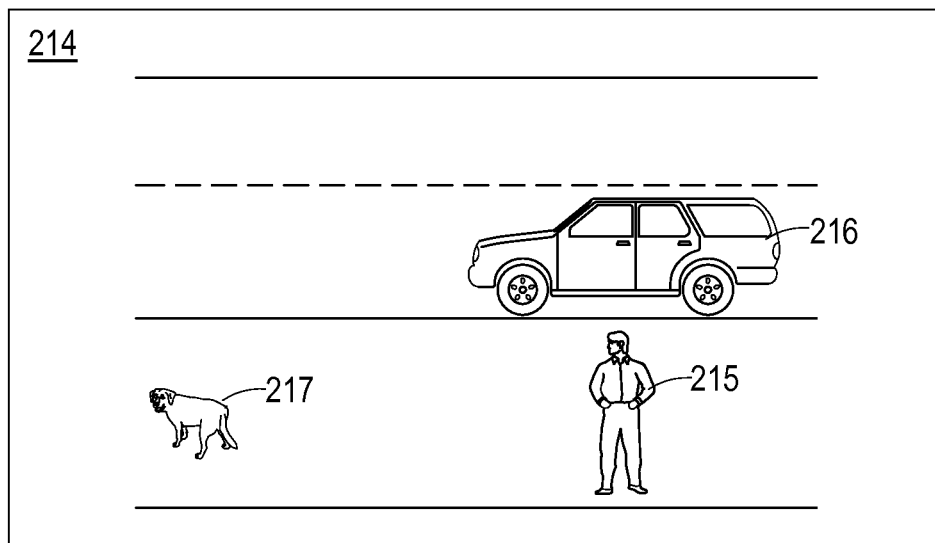
FIG. 2 is a block diagram depicting a computerized video surveillance system.
Figure 2:
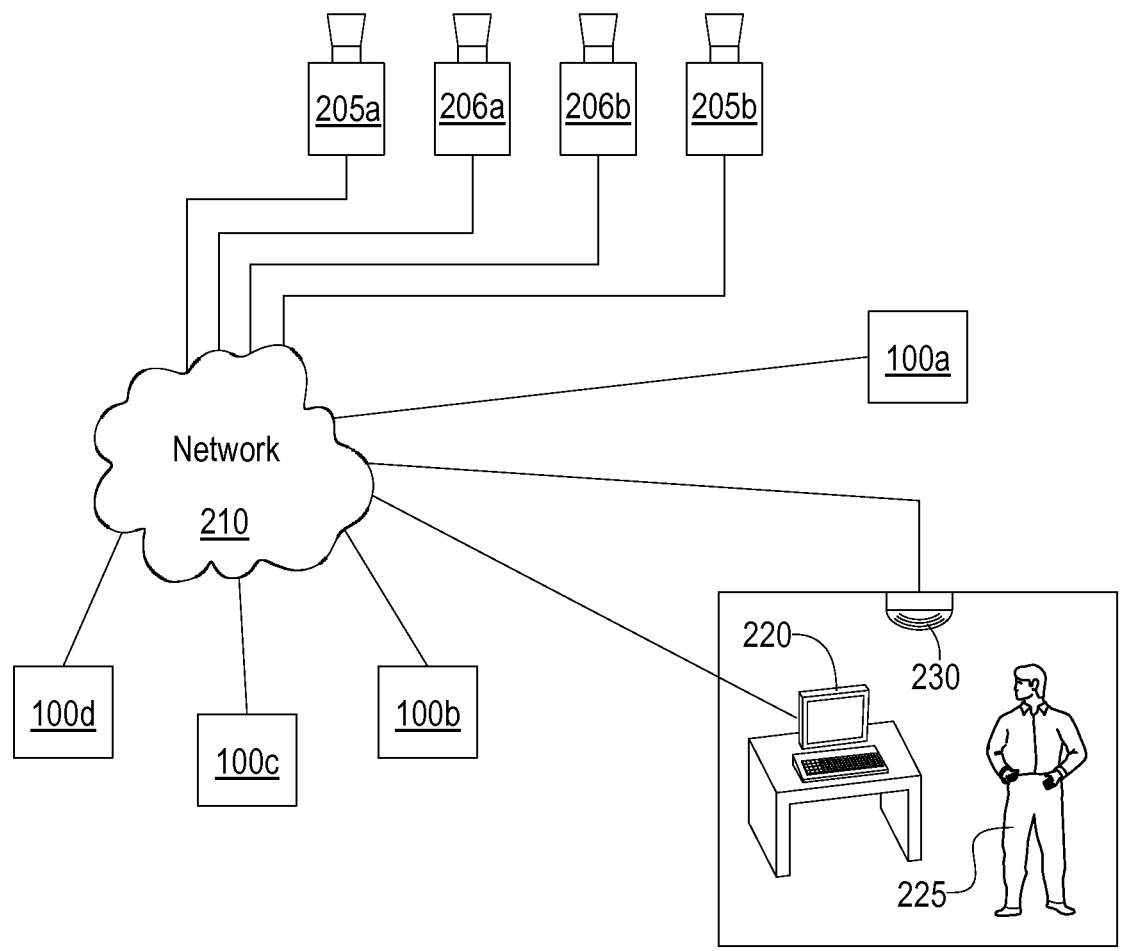

FIG. 2 illustrates surveillance system 200. Surveillance system 200 contains cameras 205*a*-205*b*, infrared cameras 206*a*-206*b*, analysis systems 100*a*, 100*b*, 100*c*, and 100*d*, area 214 (as shown containing person 215, automobile 216, and animal 217), network 210, terminal 220, operator 225, and alarm 230. Cameras 205*a*-205*b* are video cameras capable of receiving light in the visible spectrum and converting said light into a series of rasterized images. Infrared cameras 206*a*-206*b* are video cameras capable of receiving light in the infrared spectrum and converting said light into a series of rasterized images.

Each rasterized image contains a set of pixels, each pixel having x and y coordinates corresponding to said pixel's location in a regular two-dimensional grid approximately representing the viewing plane. Also, each pixel is associated with a color value (a numerical representation of color in a color space such as industry standard RGB or CMYK color spaces) or with a light intensity value (i.e., where monochrome).

Area 214 is a location in which person 215, automobile 216, or animal 217 may be visible to one or more cameras 205*a*-205*b* and infrared cameras 206*a*-206*b*. Network 210 is any suitable computer network. In an exemplary embodiment, network 210 is an Ethernet network using Internet Protocol. Terminal 220 is a computer system capable of receiving and displaying a stream of video data to operator 225. In an exemplary embodiment, terminal 220 can display video data from cameras 205*a*-205*b* and infrared cameras 206*a*-206*b*. Alarm 230 is a device capable of displaying a visible or audible message or alarm. Cameras 205*a*-205*b*, infrared cameras 206*a*-206*b*, analysis systems 100*a*, 100*b*, 100*c*, and 100*d*, terminal 220, and alarm 230 are all connected to network 210. In an exemplary embodiment, each camera 205*a*-205*b* and infrared camera 206*a*-206*b* is associated with one analysis system 100*a*-100*d*.

Operator 225 is a human who may be tasked with watching, supervising, or guarding area 214. In exemplary embodiments of the disclosed invention, analysis systems 100*a*-100*d* analyze video from cameras 205*a*-205*b* and infrared cameras 206*a*-206*b* to detect activities of a person 215, an automobile 216, or an animal 217. As a result of detecting certain activities, analysis systems 100*a*-100*d* may alert operator 225 via alarm 230, terminal 220, or both terminal 220 and alarm 230. All of said video data and activities may be recorded on one or more analysis systems 100*a*-100*d*.

Figure 3:
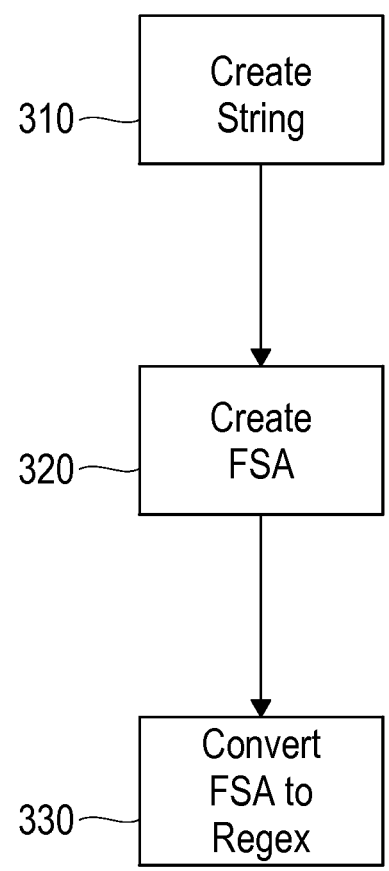
FIG. 3 is a flow chart illustrating a method of building a model.

FIG. 3 illustrates model building method 300 and is comprised of exemplar loading step 310, automaton creating step 320, and regex (regular expression) converting step 330. In model building method 300, analysis system 100 builds models which can be compared to novel patterns in order to determine whether a novel pattern is a certain type of pattern. As further described below, the disclosed invention encodes patterns of motion as strings. In an exemplary embodiment, object tracking movement may occur in the following directions: East (right), Northeast (up and right), North (up), Northwest (up and left), West (left), Southwest (down and left), South (down), Southeast (down and right), and each direction is mapped into a character (respectively, a, b, c, d, e, f, g, and h). Parenthetical directions illustrate movement in a two dimensional viewing plane orthogonal to the viewer; and cardinal and ordinal directions correspond to the same viewing plane when viewed from above. So, if an object moves North (up), North (up), Northeast (up and right), East (right), then this pattern is mapped into the string, "ccba." The directions described are used for convenience and do not necessarily directly correspond to directions of movement of tracked objects, but rather represent relative motion as perceived or interpreted by the disclosed invention.

In exemplar loading step 310, analysis system 100 loads one or more strings which represent examples of a particular pattern of motion (i.e., positive exemplars), as well as one or more strings which do not represent examples of said pattern of motion (i.e., negative exemplars).

In automaton creating step 320, analysis system 100 uses the RPNI (Regular Positive Negative Inference) offline learning algorithm to create (learn) a finite state automaton (FSA) representing the regular grammar that accepts strings belonging to a language defined by the strings loaded in exemplar loading step 310. Said FSA is stored in memory 130.

In regex converting step 330, analysis system 100 uses the JFLAP (Formal Language & Automata Package, available at http://www.jflap.org) library to convert said FSA created by automaton creating step 320 into a regular expression. Said regular expression is stored in memory 130.

A regular expression is an expression that specifies a set of strings using rules which may be more concise than lists of a set's members, and regular expressions are commonly used in many computer systems to perform pattern matching tasks on strings (e.g., to determine if a string is a valid email address, a phone number, or other more complicated pattern matching tasks). The regular expressions generated in regex converting step 330 are used in other aspects of the disclosed invention to detect patterns of motion. That is, novel patterns of motion are mapped into strings and compared to regular expressions according to regex comparison method 400.

Figure 4:
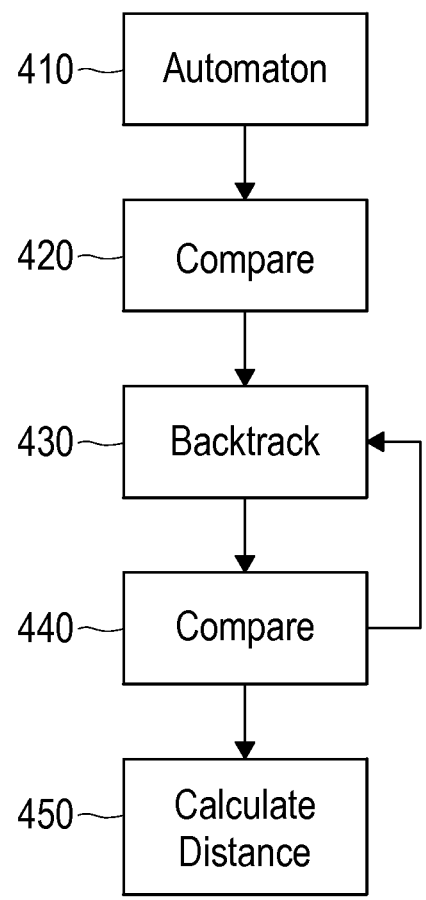
FIG. 4 is a flow chart illustrating a method of comparing a string to a model.

FIG. 4 illustrates regex comparison method 400. In regex comparison method 400, analysis system 100 calculates (1) the similarity of a novel pattern string with a regular expression and (2) a confidence measure for the similarity measurement. Algorithms to compare the similarity of two strings are well known in the art. One such algorithm, the Levenshtein Distance algorithm (which is known in the art), is expanded upon by the disclosed invention in order to compare novel pattern strings to regular expressions. The Levenshtein Distance algorithm calculates the number of characters that must be replaced, inserted, or deleted from a first string in order to convert said first string into a second string. Such number of characters is deemed the Levenshtein Distance.

As opposed to directly comparing two strings, regex comparison method 400 compares a novel pattern string with a regular expression. Regex comparison method 400 finds a comparison string having the smallest Levenshtein Distance of all strings that match said regular expression and have the same length as said novel string.

In automaton step 410, analysis system 100 creates a finite state automaton represented by a regular expression. Regex comparison method 400 then proceeds to first comparing step 420.

In first comparing step 420, analysis system 100 attempts to map a novel pattern string into said finite state automaton. If the final state reached is an accepting state (i.e., the machine reports that the input string, as processed so far, is a member of the language it accepts), then the Levenshtein Distance between the novel pattern string and said regular expression is zero. If the final state reached is not an accepting state, then regex comparison method 400 sets a step value to one and proceeds to backtracking step 430.

In backtracking step 430, analysis system 100 backtracks in said finite state automaton a number of steps equal to said step value and performs a depth first search up to a depth equal to said step value. Said depth first search finds a number of strings which match part of said regular expression which represents said finite state machine. Regex comparison method 400 then proceeds to second comparing step 440.

In second comparing step 440, analysis system 100 concatenates each of said found strings with a portion of said novel pattern string to form comparison strings of a length equal to the length of said novel pattern string. Analysis system 100 then tests each comparison string with said finite state automaton. For a given comparison string, if the final state reached is an accepting state, then said given comparison string is recorded for use in distance calculating step 450. If the final state reached is not an accepting state for any comparison string, then said step value is incremented by one, and regex comparison method 400 proceeds to backtracking step 430.

In distance calculating step 450, analysis system 100 calculates the Levenshtein Distance of each of said strings recorded for use in second comparing step 440. The minimum Levenshtein Distance of said calculated Levenshtein Distances is the Levenshtein Distance between said novel pattern string and said regular expression.

Figure 5:
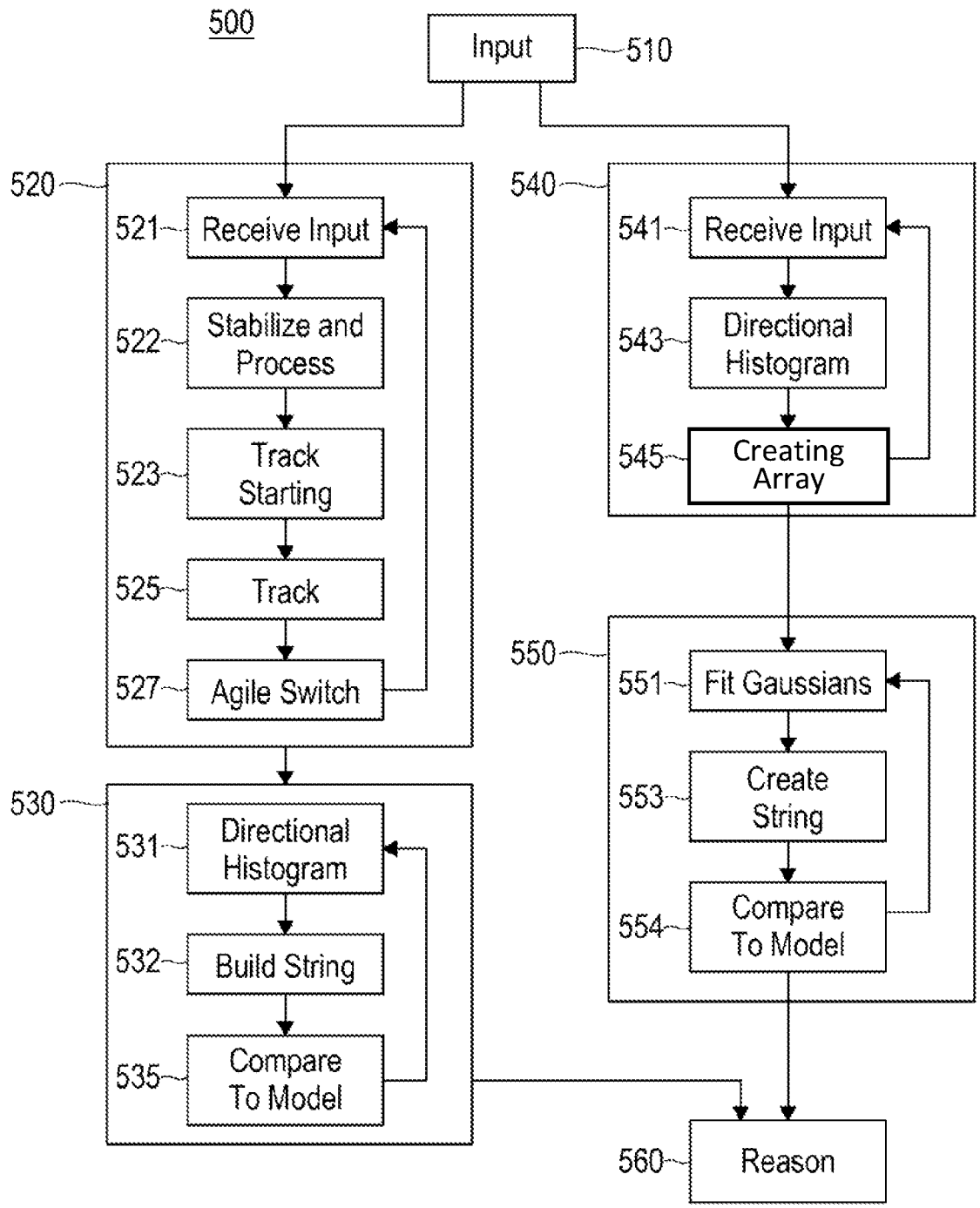
FIG. 5 is a flow chart illustrating a method of analyzing video.

FIG. 5 illustrates surveillance method 500. Surveillance method 500 is comprised of video capturing step 510, tracking step 520 (further comprising input receiving step 521, stabilizing step 522, track starting step 523, switching step 525, and track maintaining step 527), track identifying step 530 (further comprising smoothing step 531, string building step 532, and comparing step 535), periodic motion tracking step 540 (further comprising alternate input receiving step 541, directional histogram creating step 543, and similarity array creating step 545), periodic motion identifying step 550 (further comprising Gaussian fitting step 551, alternate building step 553, and alternate comparing step 554), and reasoning step 560.

In video capturing step 510, analysis system 100 receives an image captured by one or more cameras 205 (which may include, without limitation, cameras 205a-205b) or infrared cameras 206 (which may include, without limitation, infrared cameras 206a-206b) and is transmitted to, and stored within memory 130 or storage medium 120 of one or more analysis systems 100 (which may include, without limitation, analysis systems 100a, 100b, 100c, and 100d). Alternatively, an analysis system 100 may extract an image from a prerecorded video file which may be stored on storage medium 120. Analysis system 100 repeats video capturing step 510 continuously while performing surveillance method 500 to receive a series of time-ordered images, i.e., a video stream.

In tracking step 520, analysis system 100 tracks objects moving in the video stream. Tracking step 520 further comprises several sub-steps.

In input receiving step 521, a sub-step of tracking step 520, analysis system 100 receives an image and stores said image in memory 130.

In stabilizing step 522, a sub-step of tracking step 520, said received image is adjusted to compensate for camera jitter, rotational camera motion, and translational camera motion.

In performing stabilizing step 522, analysis system 100 first performs a Shi-Tomasi edge-finding algorithm (known in the art) on a first image to identify significant feature points in said first image. The Shi-Tomasi algorithm detects features, including, without limitation, corners and edges by approximating the weighted sum of squares of shifted image patches (regions of an image). This approximation results in a vector multiplied by the structure tensor, for which there are two eigenvalues $X_1$ and $X_2$. If either $X_1$ or $X_2$ is large and positive, then an edge or corner is found. Analysis system 100 records the coordinates (x,y) of each found edge or corner (i.e., where $X_1$ or $X_2$ is large and positive) in memory 130. The Shi-Tomasi algorithm is periodically re-applied to identify and store in memory 130 the coordinates (x,y) of edges and corners. In an exemplary embodiment, the Shi-Tomasi algorithm is re-applied once per second or when camera panning exceeds a threshold, and a stabilization module keeps track of camera panning and cumulative drift.

Analysis system 100 then performs a pyramidal Lucas-Kanade algorithm (known in the art) on each subsequent image. The Lucas-Kanade algorithm determines the most likely location in a current image for a point of interest in a prior image. The Lucas-Kanade algorithm solves this problem by determining what is known in the art as optical flow at each point of interest. In the disclosed invention, the Lucas-Kanade algorithm is combined with the Shi-Tomasi edge finding algorithm, using the feature points identified by the Shi-Tomasi edge-finding algorithm as the points of interest of the Lucas-Kanade algorithm.

In applying the Lucas-Kanade algorithm, analysis system 100 determines a two-dimensional translation for each point of interest for R unique rotations within a testing range. Then, analysis system 100 determines the most common translation-rotation pair using a RANSAC algorithm (known in the art), which, in our view, is a faster algorithm than other suitable algorithms which may also be used. For each iteration, random sets of 3 or more feature points are selected. From each set, the corresponding translation (x, y) and rotation $\theta$ are determined. The translation and rotation are applied to a larger set of feature points, and an objective function determines the cost of the match. After many iterations are complete, the image is rotated by $\theta_{mm}$ and translated by $(x_{min}, y_{min})$, where $\theta_{min}$, and $(x_{min}, y_{min})$ are the rotation and translation, respectively, with the lowest cost. The image is then rotated by $\theta$ and translated by (x, y) to transform each subsequent image into a stabilized image, which analysis system 100 stores in memory 130. Analysis system 100 then proceeds to track starting step 523.

In an exemplary embodiment, the number of points matched for each random iteration is equal to three, the maximum number of iterations is 500, the cost function evaluates a number of transformed points with distance$\leq$0.05*image size, the number of points to evaluate cost is equal to the number of feature points, and ends matching when the number of points with a low cost$\geq$0.5*the number of feature points.

In track starting step 523, a sub-step of tracking step 520, new foreground objects are identified. Track starting step encompasses the steps of: Gaussian mixture background subtraction, morphological opening, k-means clustering, spatial filtering, temporal filtering, and adaptive thresholding.

First, analysis system 100 performs the Gaussian mixture (GM) background subtraction algorithm (known in the art) on said stabilized image to identify areas of said stabilized image which are different than expected by a Gaussian mixture model (i.e., not part of the background) and which, by implication, are potentially foreground objects. In applying the Gaussian mixture background subtraction algorithm to said stabilized image, said stabilized image is transformed into a stabilized foreground image that shows only pixels which are in the foreground. In one exemplary embodiment, analysis system 100 transforms said stabilized image into said stabilized foreground image by setting each pixel identified as part of the background to black and by setting each pixel identified as part of the foreground to white.

Next, analysis system 100 performs a morphological opening on said stabilized foreground image to transform said stabilized foreground image into an opened foreground image. As a result of performing said morphological opening, analysis system 100 removes unnecessary noise from said stabilized foreground image.

Pixels in the foreground image are considered to be "in" a set, whereas pixels in the background are "not in" said set. Morphological opening is the dilation of the erosion of a set A (i.e., the set of pixels identified as being different than expected) by a structuring element B. In other words, morphological opening erodes set A by a structuring element B to create an eroded set C, then dilates eroded set C to create opened set D.

In an exemplary embodiment, structuring element B is an object with a diameter of three (3) pixels (which may be a 3 pixel×3 pixel square). In said exemplary embodiment, erosion removes from said stabilized foreground image (in one exemplary embodiment, by setting to zero) any foreground pixels which are not completely surrounded by other foreground pixels, and dilation adds to said stabilized foreground image (in one exemplary embodiment, by setting to a nonzero value) any pixels which have at least one neighboring pixel in the foreground. As a result, noise is removed from said stabilized foreground image (such noise including, without limitation small groups of foreground pixels).

Next, analysis system 100 performs k-means clustering on said opened foreground image to identify k blobs. The k-means clustering algorithm is method of cluster analysis which aims to partition n observations (i.e., pixels as observations of a foreground object at a particular location in the two-dimensional coordinate system of said opened foreground image) into k clusters in which each observation belongs to the cluster with the nearest mean. In other words, foreground objects are grouped into clusters of pixels, and the disclosed invention infers that all of the pixels in the same cluster correspond to the same moving foreground object.

First, k pixels are selected at random from the foreground pixels in said opened foreground image to create k clusters, and the mean of each cluster is the value of the pixel used to create each cluster. Next, each other foreground pixel in said opened foreground image is grouped with the cluster having the closest mean. Then, the mean of each cluster is recalculated, and all foreground pixels in said opened foreground image are again grouped (reclustered) with the cluster having the closest mean. The steps of: recalculating cluster means and reclustering are repeated until reclustering does not change the clusters. Each cluster of pixels is referred to as a blob, and analysis system 100 stores each blob in memory 130.

In an exemplary embodiment, the value of k (i.e., the number of clusters) is chosen adaptively and depends upon the percentage of foreground pixels in the image sequence. For example, if the foreground pixels account for 40% of the total number of image pixels, and assuming that the average size of each blob is around 2% of the total number of image pixels, total number of clusters, k=20, calculated as 40 divided by 2, per the above percentages.

Next, analysis system 100 performs spatial filtering. First, the height, weight, and size of each blob are calculated. Blobs having a size less than $\tau_1$, size greater than $\tau_2$, a height/width ratio of less than $\tau_3$, and a height/width ratio greater than $\tau_4$ pass through the spatial filter and are not removed from processing. All other blobs are not processed further. $\tau_1$, $\tau_2$, $\tau_3$, and $\tau_4$ are thresholds and may be adjusted to achieve different results. However, in an exemplary embodiment, $\tau_1$ is 225 $\tau_2$ is 25 $\tau_3$ is 3 and $\tau_4$ is 0.3.

Next, analysis system 100 performs temporal filtering to calculate a confidence measure δ for each blob that has passed through the spatial filter. Temporal filtering is performed over successive images. As analysis system 100 identifies a blob in successive images, the confidence that a blob is a novel moving foreground image increases. The confidence metric is calculated by increasing the confidence metric for a given blob for each successive image in which said blob is detected, and reducing the confidence metric for said blob for each successive image in which said blob is not detected.

Confidence is increased or decreased according to whether or not a blob is detected over subsequent frames. In an exemplary embodiment, the equation for confidence gain is:

$$\delta = \delta + 0.5^{-n}$$

and the equation for confidence loss is:

$$\delta = \delta - 0.5^{-n}$$

where n is the number of frames for which the object is continuously detected (i.e., visible to analysis system 100) or continuously not detected (i.e., not visible to analysis system 100). Thus, δ should be increased by $0.5^{-n}$ for confidence gain and similarly decreased for the confidence loss.

The composite confidence update equation is:

$$\delta = \delta + ((0.5^{-n})V(-0.5^{-n}))$$

As an illustrative example, a blob has an initial confidence value of 0, and, if said blob is visible for 3 consecutive frames, and is then not visible for 2 consecutive frames (for a total of 5 consecutive frames), then, the final confidence value, δ, is calculated as follows:

$$\delta = \delta + 0.5^{-n1} - 0.5^{-n2} = 0 + 0.5^{-3} - 0.5^{-2} = 4$$

Next, analysis system 100 performs adaptive thresholding to determine when to start tracking objects. Analysis system 100 maintains a list of blobs which are potentially moving foreground objects, along with each blob's associated confidence metric. As blobs are identified and as blobs identified in prior images are re-identified or are not re-identified, the confidence metric for each blob increases or decreases, respectively. If the confidence metric for a blob is greater than σ, then that blob is deemed a moving foreground object, a track is started for said object using the two-dimensional coordinates (x,y) of the centroid of said blob, and said moving foreground object is tracked in track maintaining step 525. If the confidence metric decreases below τ, then the blob is no longer maintained in the list of blobs which are potentially moving foreground objects. In an exemplary embodiment, σ is 8 and τ is −8. In said exemplary embodiment, a blob can go undetected even for 3 consecutive frames without being removed from the potential blobs list.

As used herein and in the claims, the term "centroid" means the number which is the arithmetic mean of the coordinate values for each pixel in a set of pixels. In exemplary embodiments analysis system 100 calculates and stores the centroid of blobs using floating point data types.

In switching step 527, a sub-step of tracking step 520, analysis system 100 determines the most appropriate tracking algorithm to use given the current circumstances. Analysis system 100 contains a set of six constants ($k_1$, $k_2$, $k_3$, $k_4$, k5, and $k_6$—the sum of $k_1$ through k6 being equal to 1) for each tracking algorithm (said constants are determined based on the characteristics of each tracking algorithm), used by analysis system 100, in connection with currently observed values, to determine which tracking algorithm is most appropriate for the current circumstances. The currently observed values are the stabilization error ($v_1$), track overlap amount ($v_2$), probability of a jump detected ($v_3$), probability of a drift detected ($v_4$), high track speed ($v_5$), and low track speed ($v_6$).

In an exemplary embodiment, the values $v_1$-$v_6$ are normalized to have values from 0 to 1. Stabilization error (v1) can be calculated either from a high amount of moving image, e.g. v1=min(1, sum(fgimage)/0.25*imgsize), or from a high percentage of error points from the optical flow algorithm. Track overlap amount (v2) can calculated for each track i=max(area of overlap(track i, track j)/total area), where j≠i. Probability jump detected (v3) can be calculated from a loss of matching color while movement is still detected. Probability drift detected (v4) can be calculated from a loss of matching color and movement. Speed values (v5 and v6) can be calculated as a normalized speed and a normalized constant minus speed, respectively, where the normalization and constant value depend on the expected speed of objects being tracked.

Based on these constants and values, analysis system 100 calculates a performance metric, P, for each tracking algorithm, using the following equation:

$$P=(k_1*v_1)+(k_2*v_2)+(k_3*v_3)+(k_4*v_4)+(k_5*v_5)+(k_6*v_6)$$

On each execution of switching step 527, analysis system calculates a performance metric, $P_{current}$, for the currently selected tracking algorithm. If $P_{current}$ is less than Φ, then analysis system 100 proceeds to track maintaining step 525. Otherwise, the current state is saved, P is calculated for each other tracking algorithm, and the algorithm having the lowest P value is selected. Then, analysis system 100 transmits said saved current state to said newly selected tracking algorithm. The state is a set of tuples (x,y,n,l) where x and y are coordinates of the center or the centroid of tracked objects, n is the frame number, and l is intensity. Since tracking is occurring in real-time, in our view, a limited number of frames need to be saved, the number depending on the latency of the tracking algorithms and the frequency of switching. In one exemplary embodiment, 100 frames of history are saved.

In an alternative embodiment, the object size may also be included in the tuple.

In track maintaining step 525, a sub-step of tracking step 520, analysis system 100 tracks each moving foreground object using the tracking algorithm selected during the most recent invocation of switching step 527. Analysis system 100 applies the selected tracking algorithm to associate recently tracked moving foreground objects with each moving foreground object for the current image. Analysis system 100 also calculates the current tracked location of each moving foreground object (i.e., the two-dimensional coordinates (x,y) of the centroid of each moving foreground object). Then, analysis system 100 records in memory 130 the current tracked location of each moving foreground object in association with prior tracked locations for each moving foreground object, such that the tracked path of each object is preserved. In other words, in track maintaining step 525, analysis system 100 produces a list of unique moving foreground objects and their current tracked location. In repeated performance of track maintaining step 525, analysis system 100 appends the current tracked location of each unique moving foreground object to the list of prior tracked locations for each unique moving foreground object. Accordingly, the list of prior and current tracked locations for a given unique moving foreground object is the tracked path for said unique moving foreground object.

Switching step 527 may not be performed for each processed image, and in an exemplary embodiment, switching step 527 is performed once every 30 images. Also, in an exemplary embodiment, Φ is 0.5, but in variations of said exemplary embodiment, the value of Φ varies based on the values of constants $k_1$ through $k_6$.

In an exemplary embodiment, analysis system 100 selects the most appropriate tracking algorithm from the following algorithms: GM background subtraction with mean shift (with $k_1$=$k_3$=$k_6$=0.3; $k_2$=0.1; $k_4$=$k_5$=0), Lucas-Kanade (LK) optical flow (with $k_1$=$k_2$=$k_3$=0; $k_4$=0.5; $k_5$=$k_6$=0.25), and color-histogram using mean shift (described in more detail below) (with $k_1$=$k_6$=0; $k_2$=$k_3$=0.25; $k_4$=0.4; $k_5$=0.1). Any number of tracking algorithms may be used.

In track identifying step 530, analysis system 100 compares each tracked path to one or more models created according to model building method 300. If a tracked path is close enough to a model, then analysis system 100 has identified said tracked path, and the result of said comparison is stored in memory 130. The sub-steps of track identifying step 530 (smoothing step 531, string building step 532, and comparing step 535) are performed for each tracked path.

In smoothing step 531, a sub-step of track identifying step 530, analysis system 100 transforms a tracked path into a smoothed path using a filtering method. We speculate that low-pass filters are preferred. In one exemplary embodiment, analysis system 100 transforms said tracked path into a smoothed path using a simple Gaussian filter with a sampling window of 20 and a standard deviation (σ), where the standard deviation value is dependent on the amount and intensity of background noise in the image.

In string building step 532, a sub-step of track identifying step 530, said tracked path is converted into a path string. In an exemplary embodiment, analysis system 100 uses the characters and mappings described in the description of FIG. 3 to transform said tracked path into a path string.

Said tracked path contains a series of tracking coordinates for a foreground object. Each pair of coordinates corresponds to the position of a tracked object in a given image. Where the movement between successive images (i.e., the distance between two successive tracked coordinate pairs) is equal to one pixel, then such motion is converted into the appropriate character and is appended to a path string (which string is initially empty).

One embodiment of the disclosed invention uses the Lucas-Kanade pyramidal flow algorithm (known in the art), which inherently returns values in the subpixel level. Accordingly, returned (x,y) values are floating point values. Motion of more than one pixel is handled at higher pyramid levels, where the image is scaled down (and, as a scaled image, motion contained therein is viewed as subpixel).

Where the movement between successive images is less than one pixel, then analysis system 100 must determine whether or not such motion should be mapped into a character. Accordingly, analysis system 100 proceeds as follows.

Each tracked position (as tracked in track maintaining step 525) has a previous tracked position ($x_{previous}, y_{previous}$). For the first tracked position, the previous tracked position is the initial track as calculated in track starting step 523.

For each subsequent tracked position ($x_{current}, y_{current}$), analysis system 100 calculates a current slope between the two points ($x_{previous}, y_{previous}$) and ($x_{current}, y_{current}$). Said current slope is then compared to the slope of the eight possible movement directions described in FIG. 3. Analysis system 100 selects a first candidate direction and a second candidate direction. Said first candidate direction and said second candidate direction are the two movement directions having the closest slope to said current slope. A vector in said first candidate direction of length 1 is added to ($x_{previous}, y_{previous}$) to calculate ($x_{first}, y_{first}$), and a vector in said second candidate direction of length 1 is added to ($x_{previous}, y_{previous}$) to calculate ($x_{second}, y_{second}$). Analysis system 100 calculates: (a) the distance between ($x_{previous}, y_{previous}$) and ($x_{first}, y_{first}$) as $d_{first}$; (b) the distance between ($x_{previous}, y_{previous}$) and ($x_{second}, y_{second}$) as $d_{second}$; and, (c) the distance between ($x_{current}, y_{current}$) and ($x_{previous}, y_{previous}$) as $d_{nil}$. If $d_{nil}$ is the smallest distance of distances $d_{nil}$, $d_{first}$, and $d_{second}$, then no character is appended to said path string. If $d_{first}$ or $d_{second}$ is the smallest distance of distances $d_{nil}$, $d_{first}$, and $d_{second}$, then a character corresponding to said first direction (if $d_{first}$) or said second direction (if $d_{second}$), respectively, is appended to said path string. Analysis system 100 then proceeds to the next tracked position, continuing to append characters to said path string according to string building step 532.

In comparing step 535, a sub-step of track identifying step 530, said path string for each tracked object is compared, according to regex comparison method 400, to one or more models as created by model building method 300. Analysis system 100 then stores the result of said comparison in memory 130.

In periodic motion tracking step 540, analysis system 100 extracts information from said stabilized foreground image and compares said extracted information to information extracted from prior stabilized foreground images to create a data structure representing motion. Analysis system 100 then analyzes said data structure to identify periodic motion. Periodic motion tracking step proceeds according to the following sub-steps (alternate input receiving step 541, directional histogram creating step 543, and similarity array creating step 545).

In alternate input receiving step 541, a sub-step of periodic motion tracking step 540, analysis system 100 receives an image and stores said image in memory 130.

In directional histogram creating step 543, a sub-step of periodic motion tracking step 540, analysis system 100 creates one or more directional histograms from said image received by alternate input receiving step 541. A directional histogram is a one dimensional array where each element contains the mean intensity value for a row or column of pixels. In an exemplary embodiment, analysis system 100 creates six directional histograms: a first directional histogram of a first half of said image along a horizontal axis, a second directional histogram of said first half of said image along a vertical axis, a third directional histogram of a second half of said image along said horizontal axis, a fourth directional histogram of said second half of said image along said vertical axis, a fifth directional histogram of said image along said horizontal axis, and a sixth directional histogram of said image along said vertical axis. Analysis system 100 stores each of said directional histograms in memory 130. The remaining sub-steps of periodic motion tracking step 540 are performed for each of said directional histograms.

In similarity array creating step 545, a sub-step of periodic motion tracking step 540, analysis system 100 creates a similarity array which is a time-ordered series of difference values, each difference value corresponding to a difference between two directional histograms created in directional histogram creating step 543. As stated above, each directional histogram is an array. In similarity array creating step 545, analysis system 100 calculates the root mean square deviation ("RMSD" and also known as the root mean square error ("RMSE")) of a current directional histogram with one or more prior directional histograms, storing each result in said similarity array in time order.

The RMSD for a first directional histogram, $\theta_1$, with respect to a second directional histogram, $\theta_2$, is defined as follows:

$$\theta_1 = \begin{bmatrix} x_{1,1} \\ x_{1,2} \\ \vdots \\ x_{1,n} \end{bmatrix} \text{ and } \theta_2 = \begin{bmatrix} x_{2,1} \\ x_{2,2} \\ \vdots \\ x_{2,n} \end{bmatrix}.$$

$$RMSD(\theta_1, \theta_2) = \sqrt{MSE(\theta_1, \theta_2)} = \sqrt{E((\theta_1 - \theta_2)^2)} = \sqrt{\frac{\sum_{i=1}^{n}(x_{1,i} - x_{2,i})^2}{n}}.$$

If the RMSD between two directional histograms is low, we infer that the two images (or sub-regions of interest in two images) are similar.

In an exemplary embodiment, analysis system 100 retains a directional histogram for the 150 immediately-preceding images. Analysis system 100 then calculates RMSD of said current directional histogram with respect to each of said 150 retained directional histograms, and stores each calculated RMSD in said similarity array ordered in the time sequence of said retained directional histograms.

In periodic motion identifying step 550, analysis system 100 analyzes said similarity array to identify periods of increasing and decreasing similarity between directional histograms. Analysis system 100 then translates said identified periods into a string, which is compared to a model. Periodic motion identifying step is comprised of the following sub-steps (Gaussian fitting step 551, alternate building step 553, and alternate comparing step 554).

In Gaussian fitting step 551, a sub-step of periodic motion identifying step 550, analysis system 100 fits one or more Gaussian distribution functions to data in said similarity array. As stated above, each element in said similarity array is a RMSD between two directional histograms, and each index of said similarity array corresponds to the order of said RMSD values. Thus, each element of said similarity array may be plotted on a two dimensional graph (having a horizontal x-axis and a vertical y-axis) using the index of the similarity array as the x coordinate (also corresponding to time) and the RMSD value at each index as the y coordinate.

To perform Gaussian fitting step 551, analysis system 100 first segments said similarity array into one or more segments by identifying local minima.

In an exemplary embodiment, analysis system 100 segments said similarity array by iterating through each element in said similarity array, viewing a current element (the $i^{th}$ element), a next element (the i+1 element), and a subsequent element (the i+2 element). If said current element is less than 0.95 multiplied by the largest element seen in the current iteration (i.e., it is not near a local maxima), and if said next element is less than said current element and said subsequent element, then said current element is considered the last element in the current segment, and said next element is the first element in a next segment.

Next, analysis system 100 fits a Gaussian distribution to the data in each of said one or more segments. For each segment as a current segment, analysis system 100 first removes each element in said current segment having a value less than a filtering constant multiplied by the largest value in said current segment. In an exemplary embodiment, said filtering constant is 0.2. Thus, any "low" values are removed from said current segment to create a current filtered segment.

After creating said current filtered segment, analysis system 100 fits a second degree polynomial to the natural log of said current filtered segment. In an exemplary embodiment, analysis system 100 uses the polyfit(x,y,n) function of the Matlab brand software product, where x is an array of indexes to said similarity array for said current segment, y is an array of the natural log of each value in said similarity array for said indexes for said current segment, and n is 2.

Thus, if a function $f(x)=ax^2+bx+c$ describes the data in said current filtered segment, analysis system 100 takes the natural log of f(x) as $p(x)=\ln(ax^2+bx+c)$. Next, using numerical methods, analysis system 100 calculates the best fitting coefficients a, b, and c for p(x).

Analysis system 100 assumes that the data is a Gaussian distribution, and maps coefficients a, b, and c into the Gaussian function, $$f(x) = Ae^{\frac{-(x-\mu)^2}{2\sigma^2}}.$$

Thus, analysis system calculates σ as equal to $$\sqrt{\frac{-1}{2a}},$$

where a is the second order polynomial coefficient as described above. A periodicity value P is calculated for each segment as $P=\sigma\sqrt{2\pi}$. Thus, analysis system 100 assigns a periodicity value to each segment.

In alternate building step 553, a sub-step of periodic motion identifying step 550, said periodicity values for each segment are mapped to a periodic motion string using simple thresholding. First, analysis system 100 creates a plurality of ranges of approximately equal size. Second, analysis system 100 assigns a character to each of said plurality of ranges. Third, analysis system 100 creates a periodic motion string by appending a character to an initially empty string for each of said segments. Each of said segments falls within one of said plurality of ranges, and each appended character is the character associated with the range within which the current segment falls.

In an exemplary embodiment, ranges of approximately 5 or 6 are used. So, values between 20 and 25 are mapped to the character, "a"; 26 through 30 to "b"; and 31-35 to "c" and so on. Thus, in said exemplary embodiment, periodicity values 30.2, 28.6, 22.1, and 24.5 are mapped to the string, "cbaa."

In alternate comparing step 554, a sub-step of periodic motion identifying step 550, each said periodic motion string calculated in alternate building step 553 compared, according to regex comparison method 400, to one or more models created via model building method 300. Analysis system 100 then stores the result of said comparison in memory 130.

In reasoning step 560, analysis system 100 evaluates information, including without limitation, tracked paths, path strings (and stored comparisons), periodic motion, periodic motion strings (and stored comparisons) to identify patterns of activity. Analysis system 100 uses abductive reasoning, along with linear temporal logic and Bayesian networks to identify probable activity.

Linear Temporal Logic (LTL) is a modal temporal logic with modalities referring to time (and is known in the art). Analysis system 100 uses LTL to encode formulae about future of paths of tracked objects and to represent real-world entities in the formal language used for instantiating model checking clauses. In our view, the advantage of using Linear Temporal Logic in modeling surveillance videos lies in the fact that each video frame can be shown to be logically related to the previous and next frames with relations that can be represented in the temporal domain. The clauses of LTL used in the disclosed invention are:

X$\phi\rightarrow\phi$ holds at the next instant;
G$\phi\rightarrow\phi$ holds on the entire subsequent path; and
F$\phi\rightarrow\phi$ eventually has to hold (somewhere on the subsequent path)

An object's spatial location is marked by the 2-tuple (x,y) representing the pixel coordinates of its centroid. In an exemplary embodiment, analysis system 100 uses a 2-tuple (x,y) comprised of integers to represent the pixel coordinates of an object's spatial location.

The first step in our approach is to map the surveillance video frames to Linear Temporal Logic. Analysis system 100 uses the following logical functions to map information into the LTL domain.

isAt($t_i$, $O_j$, $L_k$)→Object $O_j$ is at location $L_k$ at time instant $t_i$ where $t_i$ belongs to the finite domain.

isClose($\varepsilon_i$, $\varepsilon_j$)→Entities $\varepsilon_i$ and $\varepsilon_j$ are in close proximity to each other, defined by a threshold τ (close proximity is defined in terms of the unit in which the entities are defined) which may be Euclidean distance, appearance labels, or just the magnitude.

isLinear($V_i$)→Object $O_i$ has a velocity $V_i$ that is linear for a certain period of time within a pre-defined threshold.

Mag($V_i$)→Magnitude of the velocity of Object $O_i$.

Linear Temporal Logic permits use of the concept of logical abduction. Abduction (akin to deduction and induction) is a logical reasoning framework in which an explanation a for an observation b is derived by presuming that a may be true because then b would eventually follow. Thus, to abduce a from b involves determining that the occurrence of a is sufficient (or nearly sufficient) for the eventual occurrence of b, but not necessary for b to occur. Moreover, in many cases, abduction involves identifying the most probable explanation based on an observation.

Accordingly, analysis system 100 combines LTL with abduction to identify patterns of activity. Given a theory T (in LTL) describing normal/abnormal behavior in an environment and a set of observations O, analysis system 100 uses an abduction engine to compute a set $\Sigma$ of LTL formulas which are both possible explanations for O and are consistent with T. A probability distribution on the set $\Sigma$ (also called a belief state) is used to determine the most likely explanation.

Analysis system 100 calculates such probability distribution using a Bayesian network (Bayesian statistics, Bayesian networks, and Bayes' theorem are known in the art). Sensors, tracking systems, and atomic action recognition systems may provide or calculate information along with probability or confidence metrics. Analysis system 100 uses such probability or confidence metrics in connection with Bayesian techniques to abduce the most likely explanation for O consistent with T.

In an exemplary embodiment, analysis system 100 contains a set of predefined prior probabilities, said prior probabilities having been calculated using the prior probabilities of all actions A, that can eventually lead to a particular observation O, selecting the A, with maximum a priori probability.

For the purpose of teaching the disclosed invention, we describe the events "Occlusion" as $E_1$, "Human Entering Vehicle" as $E_2$, and "Burglary or Escapade" as $E_3$. Occlusion occurs if at time $t_i$, Object $O_j$ is at location $L_k$ and at the next instant, the object is not visible at any location $L_k$ close to $L_j$. A human entering a vehicle is detected at time $t_i$ if an Object $O_i$ at location $L_k$ belongs to the set of humans while there exists another object $O_j$ close to it that belongs to the set of cars, and at the next instant of time, the human is not visible near the previous location. Burglary or escapade is a composite event detected when one or more of the aforementioned events occur in the course of time with other atomic events of interest (e.g., carrying an object, velocity of a car exceeding a first threshold or velocity of a human exceeding a second threshold).

$E_1$, $E_2$, and $E_3$ are defined as follows:

$$E_1 \rightarrow isAt(t_i, O_j, L_k) \wedge G([\forall j]:isClose(L_j, L_k)) \wedge \neg isAt(t_{1+}, O_j, L_j) / \wedge t_{1+} \Rightarrow X\, t_i)$$

$$E_2 \rightarrow isAt(t_p, O_p, L_r) \wedge isAt(t_p, O_p, L_k) \wedge (O_i \in H) \wedge (O_j \in C) \wedge isClose(L_j, L_k) \wedge [\forall m: isClose(L_m, L_r) \wedge \neg isAt(t_{p+}, O_p, L_m)] \wedge t_{p+} \Rightarrow X\, t_p$$

$$E_3 \rightarrow O_i \in H \wedge (Mag(V_i) > T_1) \wedge H_O\, detected \wedge E_2 \wedge X (O_j \in C) \wedge F(Mag(V_j) > T_2)$$

where, $T_1 \rightarrow$ Threshold for Human velocity;
$T_2 \rightarrow$ Threshold for car velocity; and
$H_O \rightarrow$ Human carrying object.

With such descriptions, the probability of a burglary or escapade of a bank (designated by the label B) or an antique/jewelry shop (designated by the label AS) can be written as:

$$P(E=Burglary/Escapade)=P(F(isAt(t_i, L_i, B) \vee isAt(t_i, L_i, AS))) \wedge P(E_3)$$

Here, $P(F\,(isAt(t_i, L_i, B)))=dist(L_i-PL)$ and $P(F\,(isAt(t_i, L_i, AS)))=dist(L_i-AS)$. $E_3$ denotes the deterministic event presented above, and F denotes the "eventually" clause in LTL. $P(Mag(V_i)>Threshold\,T_1)$ is defined as equal to 1 when $Mag(V_i)>Threshold\,T_1$ and equal to 0 otherwise. $P(H_O$ detected) is a probability value obtained from a template matching algorithm that returns both an appearance label and the human carrying object.

Generally, template matching algorithms use digital image processing to find features in an image which match features in one or more a templates, with each template being associated with a composite object. Composite objects are identified by finding a template that most closely matches said features. For example, a template matching algorithm might identify hands, feet, legs, and faces as features, which can then be matched to a template associated with a human.

A Bayesian network is a directed acyclical graph comprised of a plurality of nodes and may also be known as a belief network or a probabilistic causal network. Bayesian networks capture believed relations (which may be uncertain, stochastic, or imprecise) between a set of variables, which are relevant to a problem. They might be relevant because they will be observable, because their value is needed to take some action or report some result, or because they are intermediate or internal variables that help express the relationships between other variables. Each node in a Bayesian Network represents a scalar variable which may be discrete, continuous or propositional.

After finding said set $\Sigma$ of LTL formulae which are both possible explanations for O and are consistent with T, analysis system 100 examines each LTL formula to form one or more Bayesian networks, the nodes of each Bayesian network representing events from each LTL formula and the directional edges of each Bayesian network representing the conditional probabilities of each event in each child node given the occurrence of each parent node. Then, analysis system 100 evaluates each Bayesian network to find the most probable.

To summarize, given a theory T (in LTL) describing normal/abnormal behavior in an environment and a set of observations O, analysis system 100 uses an abduction engine to compute a set $\Sigma$ of LTL formulas which are both possible explanations for O and are consistent with T. Analysis system 100 then calculates the most likely of the possible explanations using a Bayesian network, thus abducing a conclusion from the set of observations O.

Figure 6:
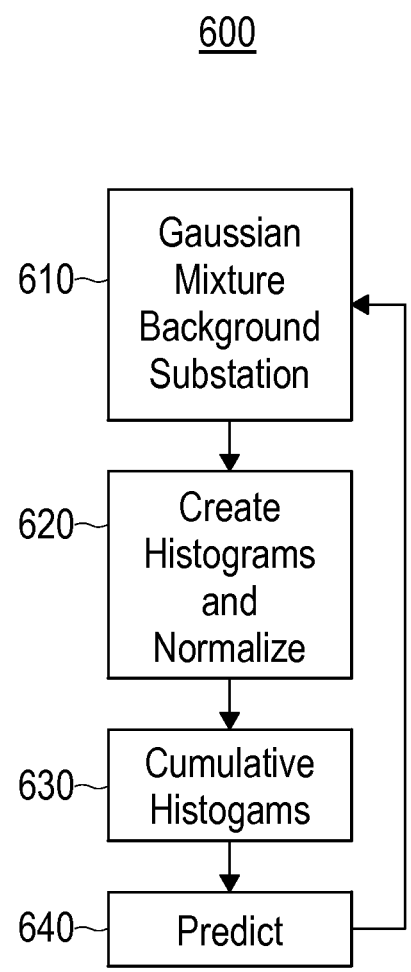
FIG. 6 is a flow chart illustrating a method of tracking objects using color histograms.

FIG. 6 illustrates color histogram method 600. Color histogram method 600 attempts to extract one or more foreground objects from a current image of a video stream.

In foreground extraction step 610, analysis system 100 identifies pixels in the foreground of a current image using a Gaussian mixture background subtraction method. Analysis system 100 then proceeds to histogram creating step 620.

In histogram creating step 620, analysis system 100 creates a foreground color histogram and a background color histogram for said current image. Each pixel in the foreground of said current image, as identified in foreground extraction step 610, is used to generate a foreground color histogram. Each pixel not in the foreground of said current image is used to generate a background color histogram. Each pixel contains three color values (R,G,B) in the range of 0-255. For the purposes of creating said foreground color histogram and said background color histogram, color values are binned, or condensed, into 32 possible values. For example, bin (0,0,0) contains R=0-7, G=0-7, and B=0-7. In other words, each pixel value is divided by 8 (without remainder), and the bin for the appropriate histogram (i.e., foreground vs. background) corresponding to the resulting RGB value is incremented by one. Finally, analysis system 100 normalizes data in each bin to the number of pixels in the foreground by multiplying each value in each bin of said background color histogram by the total number of pixels in the foreground of said current image divided by the total number of pixels in the background of said current image. Analysis system 100 then proceeds to cumulating step 630.

In cumulating step 630, analysis system 100 generates a cumulative foreground histogram and a cumulative background histogram using a moving average of foreground color histograms and background color histograms, respectively. In an exemplary embodiment, moving average is an exponential moving average. Analysis system 100 then proceeds to predicting step 640.

In predicting step 640, analysis system 100 uses said cumulative foreground histogram and said cumulative background histogram to predict whether each pixel in said current image is in the foreground or the background. This prediction does not directly consider whether each pixel was previously considered part of the foreground per foreground extraction step 610. Rather, in predicting step 640, analysis system 100 uses Bayes' theorem to predict the probability that each pixel is in the foreground. If such probability for a given pixel P(x,y) is greater than N, then P(x,y) color histogram method 600 considers P(x,y) to be in the foreground. In an exemplary embodiment, N is equal to 0.5.

Probability Image

In the equation given below, a probability image is formed using a conical shape.

$$Prob(x, y) = \max - (\max - \min) \times \sqrt{\left(\frac{x-c_x}{c_x}\right)^2 + \left(\frac{y-c_y}{c_y}\right)^2}$$

As evident from the equation, $$\sqrt{\left(\frac{x-c_x}{c_x}\right)^2 + \left(\frac{y-c_y}{c_y}\right)^2}$$

represents the equation of a circle that defines said conical shape. So, any point in the probability image has a value weighted by the confidence where the center of the ROI has the highest confidence and the edges have the lowest confidence.

Motion Image

The motion image is an image that gives the positions of all the moving pixels in the image sequence. This image is obtained using the Gaussian Mixture Background Subtraction method. The background subtraction method builds a background model of Gaussians, with a mean and standard deviation for each pixel. If the value of a pixel is not within the range predicted by the background model, the pixel is considered to be in the foreground image. Pixels in the foreground image are considered to represent moving objects which are not occluded by stationary objects.

Occlusion Detection

In a video tracking system, tracked objects may pass behind stationary objects or may otherwise be occluded from view. It is an aspect of the disclosed invention to detect when objects are occluded, then adjust inferences about tracked object velocity and position using occlusion detection. For example, as an object becomes occluded, its size may appear to become smaller and its tracked position (centroid) may not change over several frames. Thus, the object will appear to become smaller (as more of the pixels become occluded) and to decrease in velocity (because the average (x,y) will stay relatively fixed as pixels become occluded), when, in fact, the object is continuing at a fixed velocity. If, however, occlusion is detected, then the system can compensate and more accurately track the object.

The occlusion detection algorithm defines a parameter called occval that describes the ratio of the number foreground pixels that match the object in the previous frame to the number of background pixels that match the object. If the occval value falls below a threshold, then occlusion is detected. Our invention defines a framework for tracking an object and analyzing the tracks for event detection at a later stage. This framework uses the concept of occlusion to maintain a track on an object even when it becomes occluded or partially occluded.

An aspect of the disclosed invention is the combination of the probability image, the color histogram, the motion image, occlusion detection, and other methods or techniques disclosed herein, in order to more accurately and reliably track objects in video streams.

The foregoing description of the embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the allowed claims and their equivalents.

Embodiments of analysis system 100, surveillance system 200, model building method 300, regex comparison method 400, surveillance method 500, and color histogram method 600 and/or components of any thereof, can be implemented in hardware and/or software and any combination thereof as understood by one skilled in the art. Further, it will be obvious to those having skill in the art that many changes may be made to the details of the above-described embodiments without departing from the underlying principles of the invention. For example, any suitable combination of the components of analysis system 100, surveillance system 200, model building method 300, regex comparison method 400, surveillance method 500, and color histogram method 600 is possible. The scope of the present invention should, therefore, be determined only by the following allowed claims.

What is claimed is:

1. A computer system for identifying an activity, event, or chain of events in a video system, the computer system comprising: a computer containing a plurality of software modules, a video stream input, and an alarm, wherein said video stream input and said alarm are operatively connected to said computer, and wherein said plurality of software modules include a video capturing module; an object tracking module; a track identification module; a periodic motion tracking module; a periodic motion identifying module; and a reasoning module; wherein the video capturing module receives images from a video stream and outputs image data directly to both the object tracking module and the periodic motion tracking module; the object tracking module receives the image data from said video capturing module and produces a tracked path based on said image data; and the track identification module receives the tracked path from said object tracking module and performs a comparison of said tracked path to a model, wherein said computer system invokes said alarm based on said comparison; wherein said object tracking module identifies an object in said video stream based on said received image data; selects a tracking algorithm; and tracks said object using said tracking algorithm and starts a track; the periodic motion tracking module receives the image data from said video capturing module, extracts information from said image data, and compares said extracted information to information extracted from other image data to create a data structure representing motion; the periodic motion identifying module identifies periodic motion and non-periodic motion within said image data based on the output from the periodic motion tracking module; and the reasoning module receives said comparison from said track identification module, and receives data regarding said identification of periodic motion and non-periodic motion from the periodic motion identifying module, and based on both the received comparison from said track identification module and the received data regarding identification of periodic motion and non-periodic motion, the reasoning module identifies motion characteristics of the activity, event, or chain of events.

2. A computer system for identifying an activity, event, or chain of events in a video system, the computer system comprising: a computer containing a plurality of software modules, a video stream input, and an alarm, wherein said video stream input and said alarm are operatively connected to said computer, and wherein said plurality of software modules include a video capturing module; an object tracking module; a track identification module; a periodic motion tracking module; a periodic motion identifying module; and a reasoning module; wherein the video capturing module receives images from a video stream and outputs image data directly to both the object tracking module and the periodic motion tracking module; the object tracking module receives the image data from said video capturing module and produces a tracked path based on said image data; and the track identification module receives the tracked path from said object tracking module and performs a comparison of said tracked path to a model, wherein said computer system invokes said alarm based on said comparison; the periodic motion tracking module receives the image data from said video capturing module, extracts information from said image data, and compares said extracted information to information extracted from other image data to create a data structure representing motion; the periodic motion identifying module identifies periodic motion and non-periodic motion within said image data based on the output from the periodic motion tracking module; the reasoning module receives said comparison from said track identification module, and receives data regarding said identification of periodic motion and non-periodic motion from the periodic motion identifying module, and based on both the received comparison from said track identification module and the received data regarding identification of periodic motion and non-periodic motion, the reasoning module identifies motion characteristics of the activity, event, or chain of events by determining a most probable set of logical propositions based on one or more observations; wherein said most probable set of logical propositions is determined by abducing a set of logical propositions consistent with a theory and by calculating a probability distribution using a Bayesian network; wherein said theory is a multi-step event and each logical proposition of said most probable set of logical propositions corresponds to one or more steps of said multi-step event; and wherein said logical propositions are linear temporal logic propositions and each of said logical propositions is associated with a probability and each probability corresponds to uncertainty in said one or more observations.

3. The system of claim 2, wherein said reasoning module abduces said most probable set of logical propositions.

4. A computer system for identifying an activity, event, or chain of events in a video system, the computer system comprising: a computer containing a plurality of software modules, a video stream input, and an alarm, wherein said video stream input and said alarm are operatively connected to sail computer, and wherein said plurality of software modules include a video capturing module; an object tracking module; a track identification module; a periodic motion tracking module; a periodic motion identifying module; and a reasoning module: wherein the video capturing module receives images from a video stream and outputs image data directly to both the object tracking module and the periodic motion tracking module; the object tracking module receives the image data from said video capturing module and produces a tracked path based on said image data; and the track identification module receives the tracked path from said object tracking module and performs a comparison of said tracked path to a model, wherein said computer system invokes said alarm based on said comparison; the periodic motion tracking module receives the image data from said video capturing module, extracts information from said image data, and compares said extracted information to information extracted from other image data to create a data structure representing motion, the periodic motion identifying module identifies periodic motion and non-periodic motion within said image data based on the output from the periodic motion tracking module by extracting information about repetitive motion of one or more periodically-moving objects extracted from said image data of said video stream; creating a directional histogram for each of said images; creating a similarity array comprising a time-ordered series of differences between each of said directional histograms, wherein said time-ordered series of differences between each of said directional histograms are the root mean square errors between each of said directional histograms; fitting a plurality of Gaussian distributions to said time-ordered series of differences to create a set of periodicity values; and mapping said set of periodicity values into a periodicity pattern string, wherein said periodicity pattern string corresponds to periodic motion of one of said one or more periodically-moving objects extracted from said video stream; and the reasoning module receives said comparison from said track identification module, and receives data regarding said identification of periodic motion and non-periodic motion from the periodic motion tracking module, and based on both the received comparison from said track identification module and the received data regarding identification of periodic motion and non-periodic motion, the reasoning module identifies motion characteristics of the activity, event, or chain of events.

5. A computer system for identifying an activity, event, or chain of events in a video system, the computer system comprising: a computer containing a plurality of software modules, a video stream input, and an alarm, wherein said video stream input and said alarm are operatively connected to said computer, and wherein said plurality of software modules include a video capturing module; an object tracking module; a track identification module; a periodic motion tracking module; a periodic motion identifying module; and a reasoning module; wherein the video capturing module receives images from a video stream and outputs image data directly to both the object tracking module and the periodic motion tracking module; the object tracking module receives the image data from said video capturing module and produces a tracked path based on said image data; and the track identification module receives the tracked path from said object tracking module and performs a comparison of said tracked path to a module wherein said computer system invokes said alarm based on said comparison; wherein said object tracking module identifies an object in said video stream based on said received image data; selects a tracking algorithm; and tracks said object using said tracking algorithm said tracking said object includes identifying one or more clusters of foreground pixels; filtering said one or more clusters of foreground pixels based on size and ratio of height to width to create a set of track candidate clusters; calculating a temporal confidence measure for each cluster in said set of candidate clusters by: (a) first, setting each said temporal confidence measure at zero when each said cluster is first identified; and then (b) increasing or decreasing each respective said temporal confidence measure when each said identified cluster is either identified or not identified, respectively, in immediately succeeding images; starting an object track for a tracked cluster in said set of candidate clusters when said temporal confidence measure for said tracked cluster is greater than a threshold; the periodic motion tracking module receives the image data from said video capturing module, extracts information from said image data, and compares said extracted information to information extracted from other image data to create a data structure representing motion: the periodic motion identifying module identifies periodic motion and non-periodic motion within said image data based on the output from the periodic motion tracking module; and the reasoning module receives said comparison from said track identification module, and receives data regarding said identification of periodic motion and non-periodic motion from the periodic motion identifying module, and based on both the received comparison from said track identification module and the received data regarding identification of periodic motion and non-periodic motion, the reasoning module identifies motion characteristics of the activity, event, or chain of events.

6. The system of claim 2, wherein said reasoning module uses said set of logical propositions to identify activity in said video stream.

7. The system of claim 5, wherein said temporal confidence measure for each said identified cluster is increased or decreased using an update equation, wherein said update equation is $\delta=\delta+((0.5^{-n1})+(-0.5^{-n2}))$, wherein $\delta$ is said temporal confidence measure, n1 is a number of occurrences of each said identified cluster, and n2 is a number of non-occurrences of each said identified cluster.

8. The computer system according to claim 1, wherein said video stream input includes a camera.

9. The computer system according to claim 1, wherein said video stream input includes a hardware memory having video data stored thereon.

10. The computer system according to claim 1, wherein said video stream input includes a hardware device configured to receive or collect video data.

11. The computer system according to claim 1, wherein the object tracking module performs adaptive thresholding to determine when to start the track.

12. The computer system according to claim 1, wherein said selecting the tracking algorithm by the object tracking module includes the object tracking module determining a most appropriate tracking algorithm given a set of circumstances, determining which tracking algorithm is most appropriate based on observed values of at least stabilization error ($v_1$), track overlap amount ($v_2$), probability of a jump detected ($v_3$), probability of drift detected ($v_4$), high track speed ($v_5$), or low track speed ($v_6$).

13. The computer system according to claim 1, wherein said selecting the tracking algorithm by the object tracking module includes the object tracking module determining a most appropriate tracking algorithm given a set of circumstances, determining which tracking algorithm is most appropriate based on observed values of at least stabilization error (v1), track overlap amount (v2), probability of a jump detected (v3), probability of drift detected (v4), high track speed (v5), and low track speed (v6).

14. The computer system according to claim 13, wherein the object tracking module normalizes said values for stabilization error (v1), track overlap amount (v2), probability of a jump detected (v3), probability of drift detected (v4), high track speed (v5), and low track speed (v6) to have values from 0 to 1.

15. The computer system according to claim 14, wherein the object tracking module calculates a performance metric, P, for each tracking algorithm, using the following equation:

$$P=(k1*v1)+(k2*v2)+(k3*v3)+(k4*v4)+(k5*v5)+(k6*v6),$$

where k1, k2, k3, k4, k5, and k6 are each selected constants such that the sum of constants k1, k2, k3, k4, k5, and k6 is equal to 1.

16. The computer system according to claim 1, wherein said tracking said object by the object tracking module includes the object tracking module creating a foreground color histogram and a background color histogram.

17. The computer system according to claim 1, wherein the object tracking module is configured to detect an occlusion of said object and compensate for said detected occlusion.

18. The computer system according to claim 1, wherein the reasoning module identifies motion characteristics of the activity, event, or chain of events based on a combination of each of a determined probability image, a color histogram, a motion image, and an occlusion detection.

* * * * *